United States Patent
Gu et al.

(10) Patent No.: US 11,886,989 B2
(45) Date of Patent: Jan. 30, 2024

(54) SYSTEM FOR MEASURING INFORMATION LEAKAGE OF DEEP LEARNING MODELS

(71) Applicant: International Business Machines Corporation, Armonk, NY (US)

(72) Inventors: Zhongshu Gu, Ridgewood, NJ (US); Heqing Huang, Mahwah, NJ (US); Jialong Zhang, White Plains, NY (US); Dong Su, Elmsford, NY (US); Dimitrios Pendarakis, Westport, CT (US); Ian Michael Molloy, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 1172 days.

(21) Appl. No.: 16/125,983

(22) Filed: Sep. 10, 2018

(65) Prior Publication Data

US 2020/0082259 A1 Mar. 12, 2020

(51) Int. Cl.
 *G06N 3/08* (2023.01)
 *G06N 3/045* (2023.01)

(52) U.S. Cl.
 CPC .............. *G06N 3/08* (2013.01); *G06N 3/045* (2023.01)

(58) Field of Classification Search
 CPC ............................... G06N 3/08; G06N 3/0454
 USPC .......................................................... 706/25
 See application file for complete search history.

(56) References Cited

U.S. PATENT DOCUMENTS

| | | |
|---|---|---|
| 2015/0261940 A1 | 9/2015 | Roundy et al. |
| 2017/0048698 A1 | 2/2017 | Choffnes et al. |
| 2017/0212829 A1 | 7/2017 | Bales et al. |
| 2018/0129900 A1* | 5/2018 | Kiraly ............... H04L 63/0428 |
| 2019/0392305 A1 | 12/2019 | Gu et al. |
| 2022/0269942 A1 | 8/2022 | Gu et al. |

OTHER PUBLICATIONS

Gu et al., Jul. 3, 2018, "Securing Input Data of Deep Learning Inference Systems via Partitioned Enclave Execution" (Year: 2018).*

(Continued)

*Primary Examiner* — Abdullah Al Kawsar
*Assistant Examiner* — Jun Kwon
(74) *Attorney, Agent, or Firm* — Brian M. Restauro; Maeve M. Carpenter

(57) ABSTRACT

Using a deep learning inference system, respective similarities are measured for each of a set of intermediate representations to input information used as an input to the deep learning inference system. The deep learning inference system includes multiple layers, each layer producing one or more associated intermediate representations. Selection is made of a subset of the set of intermediate representations that are most similar to the input information. Using the selected subset of intermediate representations, a partitioning point is determined in the multiple layers used to partition the multiple layers into two partitions defined so that information leakage for the two partitions will meet a privacy parameter when a first of the two partitions is prevented from leaking information. The partitioning point is output for use in partitioning the multiple layers of the deep learning inference system into the two partitions.

15 Claims, 11 Drawing Sheets

(56) References Cited

OTHER PUBLICATIONS

Tuor et al., May 4, 2018, "Understanding information leakage of distributed inference with deep neural networks: Overview of information theoretic approach and initial results" (Year: 2018).*
Osia et al., Oct. 11, 2017, "Privacy-Preserving Deep Inference for Rich User Data on The Cloud" (Year: 2017).*
Ko et al., Feb. 11, 2018, "Edge-Host Partitioning of Deep Neural Networks with Feature Space Encoding for Resource-Constrained Internet-of-Things Platforms" (Year: 2018).*
Yuan & Yu, 2014, "Privacy Preserving Back-Propagation Neural Network Learning Made Practical with Cloud Computing" (Year: 2014).*
Hua et al., Jun. 24, 2018, "Reverse Engineering Convolutional Neural Networks Through Side-channel Information Leaks" (Year: 2018 ).*
Hitaj et al., 2017, "Deep Models Under the GAN: Information Leakage from Collaborative Deep Learning" (Year: 2017).*
Amazon AI. https://aws.amazon.com/amazon-ai/. [downloaded Aug. 8, 2018].
Darknet Reference Model. https://pjreddie.com/darknet/imagenet/#reference. [downloaded Aug. 8, 2018].
Extraction. https://pjreddie.com/darknet/imagenet/#extraction. [downloaded Aug. 8, 2018].
Google Cloud AI. https://cloud.google.com/products/machine-learning/. [downloaded Aug. 8, 2018].
Have I been pwned? https://haveibeenpwned.com/. [downloaded Aug. 8, 2018].
IBM Watson. https://www.IBM.com/watson/. [downloaded Aug. 8, 2018].
Intel Software Guard Extensions Remote Attestation End-to-End Example. https://software.intel.com/en-us/articles/intel-software-guard-extensions-remote-attestation-end-to-end-example [downloaded Aug. 8, 2018].
Microsoft Azure Machine Learning. https://azure.microsoft.com/en-us/services/machine-learning/. [downloaded Aug. 8, 2018].
Wikipedia: List of data breaches. https://en.wikipedia.org/wiki/List_of_data_breaches [downloaded Aug. 8, 2018].
Anati, I., Gueron, S., Johnson, S., and Scarlata, V. Innovative technology for cpu based attestation and sealing. In Proceedings of the 2nd international workshop on hardware and architectural support for security and privacy (2013).
Bengio, Y., Simard, P., and Frasconi, P. Learning long-term dependencied with gradient descent is difficult. IEEE transactions on neural networks 5, 2 (1994), 157-166.
Boivie, R., and Williams, P. Secureblue++: Cpu support for secure executables. Tech. rep., Research report, IBM, 2013.
Brasser, F., Müller, U., Dmitrienko, A., Kostiainen, K., Capkun, S., and Sadeghi, A. Software grand exposure: SGX cache attacks are practical. CoRR abs/1702.07521 (2017).
Brenner, S., Wulf, C., Goltzsche, D., Weichbrodt, N., Lorenz, M., Fetzer, C., Pietzuch, P. R., and Kapitza, R. Securekeeper: Confidential zookeeper using intel SGX. In Proceedings of the 17th International Middleware Conference (2016).
Chen, G., Chen, S., Xiao, Y., Zhang, Y., Lin, Z., and Lai, T. H. Sgxpectre attacks: Leaking enclave secrets via speculative execution. arXiv preprint arXiv:1802.09085 (2018).
Costan, V., and Devadas, S. Intel sgx explained. IACR Cryptology ePrint Archive (2016), 86.
Deng, J., Dong, W., Socher, R., Li, L.-J., Li, K., and Fei-Fei, L. Imagenet: A large-scale hierarchical image database. In Computer Vision and Pattern Recognition, 2009. CVPR 2009. IEEE Conference on (2009), IEEE, pp. 248-255.
Dosovitskiy, A., and Brox, T. Inverting visual representations with convolutional networks. In IEEE Conference on Computer Vision and Pattern Recognition (2016).
Du, W., Han, Y. S., and Chen, S. Privacy-preserving multivariate statistical analysis: Linear regression and classification. In Proceedings of the 2004 SIAM international conference on data mining (2004).
Fuhry, B., Bahmani, R., Brasser, F., Hahn, F., Kerschbaum, F., and Sadeghi, A. Hardidx: Practical and secure index with SGX. In Data and Applications Security and Privacy XXXI: 31st Annual IFIP WG 11.3 Conference (2017).
Gentry, C. A fully homomorphic encryption scheme. Stanford University, 2009.
Gilad-Bachrach, R., Dowlin, N., Laine, K., Lauter, K. E., Naehrig, M., and Wernsing, J. Cryptonets: Applying neural networks to encrypted data with high throughput and accuracy. In Proceedings of the 33nd International Conference on Machine Learning, (2016).
Glorot, X., and Bengio, Y. Understanding the difficulty of training deeep feedforward neural networks. In Proceedings of the thirteenth international conference on artificial intelligence and statistics (2010), pp. 249-256.
Götzfried, J., Eckert, M., Schinzel, S., and Müller, T. Cache attacks on intel SGX. In Proceedings of the 10th European Workshop on Systems Security (2017).
Graves, A., Mohamed, A., and Hinton, G. E. Speech recognition with deep recurrent neural networks. In IEEE International Conference on Acoustics, Speech and Signal Processing (2013).
Gupta, D., Mood, B., Feigenbaum, J., Butler, K., and Traynor, P. Using intel software guard extensions for efficient two-party secure function evaluation. In International Conference on Financial Cryptography and Data Security (2016).
Hähnel, M., Cui, W., and Peinado, M. High-resolution side channels for untrusted operating systems. In 2017 USENIX Annual Technical Conference (2017).
Hannun, A. Y., Case, C., Casper, J., Catanzaro, B., Diamos, G., Elsen, E., Prenger, R., Satheesh, S., Sengupta, S., Coates, A., and Ng, A. Y. Deep speech: Scaling up end-to-end speech recognition. CoRR abs/1412.5567 (2014).
He, K., Wang, Y., and Hopcroft, J. A powerful generative model using random weights for the deep image representation. In Advances in Neural Information Processing Systems (2016).
He, K., Zhang, X., Ren, S., and Sun, J. Deep residual learning for image recognition. In IEEE Conference on Computer Vision and Pattern Recognition (2016).
Hinton, G., Deng, L., Yu, D., Dahl, G. E., r. Mohamed, A., Jaitly, N., Senior, A., Vanhoucke, V., Nguyen, P., Sainath, T. N., and Kingsbury, B. Deep neural networks for acoustic modeling in speech recognition: The shared views of four research groups. IEEE Signal Processing Magazine (2012).
Hinton, G. E., and Salakhutdinov, R. R. Reducing the dimensionality of data with neural networks. science 313, 5786 (2006), 504-507.
Huang, G., Liu, Z., van der Maaten, L., and Weinberger, K. Q. Densely connected convolutional networks. In Proceedings of the IEEE Conference on Computer Vision and Pattern Recognition (2017).
Jagannathan, G., and Wright, R. N. Privacy-preserving distributed k-means clustering over arbitrarily partitioned data. In Proceedings of the eleventh ACM SIGKDD international conference on Knowledge discovery in data mining (2005).
Kaplan, D., Powell, J., and Woller, T. Amd memory encryption. Tech. rep., 2016.
Krizhevsky, A., Sutskever, I., and Hinton, G. E. Imagenet classification with deep convolutional neural networks. In Advances in Neural Information Processing Systems (2012).
Küçük, K. A., Paverd, A., Martin, A., Asokan, N., Simpson, A., and Ankele, R. Exploring the use of intel sgx for secure many-party applications. In Proceedings of the 1st Workshop on System Software for Trusted Execution (2016).
Lee, S., Shih, M.-W., Gera, P., Kim, T., Kim, H., and Peinado, M. Inferring fine-grained control flow inside sgx enclaves with branch shadowing. In 26th USENIX Security Symposium (2017).
Li, M., Lai, L., Suda, N., Chandra, V., and Pan, D. Z. Privynet: A flexible framework for privacy-preserving deep neural network training with a fine-grained privacy control. arXiv preprint arXiv:1709.06161 (2017).
Lindell, Y., and Pinkas, B. Privacy preserving data mining. In Advances in Cryptology CRYPTO 2000 (2000).

(56) References Cited

OTHER PUBLICATIONS

Liu, J., Juuti, M., Lu, Y., and Asokan, N. Oblivious neural network predictions via minionn transformations. In ACM Conference on Computer and Communications Security (CCS) (2017).

Mahendran, A., and Vedaldi, A. Understanding deep image representations by inverting them. In IEEE Conference on Computer Vision and Pattern Recognition (2015).

McKeen, F., Alexandrovich, I., Berenzon, A., Rozas, C. V., Shafi, H., Shanbhogue, V., and Savagaonkar, U. R. Innovative instructions and software model for isolated execution. In Proceedings of the 2nd International Workshop on Hardware and Architectural Support for Security and Privacy (2013).

McMahan, H. B., Moore, E., Ramage, D., Hampson, S., et al. Communication-efficient learning of deep networks from decentralized data. arXiv preprint arXiv:1602.05629 (2016).

Mohassel, P., and Zhang, Y. Secureml: A system for scalable privacy-preserving machine learning. In 38th IEEE Symposium on Security and Privacy (2017).

Ohrimenko, O., Schuster, F., Fournet, C., Mehta, A., Nowozin, S., Vaswani, K., and Costa, M. Oblivious multi-party machine learning on trusted processors. In USENIX Security Symposium (2016).

Ossia, S. A., Shamsabadi, A. S., Taheri, A., Rabiee, H. R., Lane, N., and Haddadi, H. A hybrid deep learning architecture for privacy-preserving mobile analytics. arXiv preprint arXiv:1703.02952 (2017).

Pan, S. J., and Yang, Q. A survey on transfer learning. IEEE Transactions on knowledge and data engineering (2010).

Redmon, J. Darknet: Open source neural networks in c. http://pjreddie.com/darknet/, 2013-2016.

Saltaformaggio, B., Bhatia, R., Gu, Z., Zhang, X., and Xu, D. Guitar: Piecing together android app guis from memory images. In Proceedings of the 22nd ACM SIGSAC Conference on Computer and Communications Security (2015).

Saltaformaggio, B., Bhatia, R., Gu, Z., Zhang, X., and Xu, D. Vcr: App-agnostic recovery of photographic evidence from android device memory images. In Proceedings of the 22nd ACM SIGSAC Conference on Computer and Communications Security (2015).

Saltaformaggio, B., Gu, Z., Zhang, X., and Xu, D. Dscrete: Automatic rendering of forensic information from memory images via application logic reuse. In USENIX Security Symposium (2014).

Schuster, F., Costa, M., Fournet, C., Gkantsidis, C., Peinado, M., Mainar-Ruiz, G., and Russinovich, M. Vc3: Trustworthy data analytics in the cloud using sgx. In Security and Privacy (SP), 2015 IEEE Symposium on (2015).

Shokri, R., and Shmatikov, V. Privacy-preserving deep learning. In Proceedings of the 22nd ACM SIGSAC conference on computer and communications security (2015), ACM.

Shwartz-Ziv, R., and Tishby, N. Opening the black box of deep neural networks via information. arXiv preprint arXiv:1703.00810 (2017).

Silver, D., Huang, A., Maddison, C. J., Guez, A., Sifre, L., van den Driessche, G., Schrittwieser, J., Antonoglou, I., Panneershelvam, V., Lanctot, M., Dieleman, S., Grewe, D., Nham, J., Kalchbrenner, N., Sutskever, I., Lillicrap, T. P., Leach, M., Kavukcuoglu, K., Graepel, T., and Hassabis, D. Mastering the game of go with deep neural networks and tree search. Nature (2016).

Silver, D., Schrittwieser, J., Simonyan, K., Antonoglou, I., Huang, A., Guez, A., Hubert, T., Baker, L., Lai, M., Bolton, A., et al. Mastering the game of go without human knowledge. Nature 550, 7676 (2017), 354-359.

Simonyan, K., and Zisserman, A. Very deep convolutional networks for large-scale image recognition. CoRR abs/1409.1556 (2014).

Sutskever, I., Vinyals, O., and Le, Q. V. Sequence to sequence learning with neural networks. In Advances in neural information processing systems (2014), pp. 3104-3112.

Tamrakar, S., Liu, J., Paverd, A., Ekberg, J.-E., Pinkas, B., and Asokan, N. The circle game: Scalable private membership test using trusted hardware. In Proceedings of the 2017 ACM on Asia Conference on Computer and Communications Security (2017).

Vaidya, J., and Clifton, C. Privacy preserving association rule mining in vertically partitioned data. In Proceedings of the eighth ACM SIGKDD international conference on Knowledge discovery and data mining (2002).

Vaidya, J., Kantarcioğlu, M., and Clifton, C. Privacy-preserving naive bayes classification. The VLDB Journalâ€The International Journal on Very Large Data Bases (2008).

Wang, W., Chen, G., Pan, X., Zhang, Y., Wang, X., Bindschaedler, V., Tang, H., and Gunter, C. A. Leaky cauldron on the dark land: Understanding memory side-channel hazards in sgx. In Proceedings of the 24th ACM SIGSAC conference on computer and communications security (2017).

Xu, Y., Cui, W., and Peinado, M. Controlled-channel attacks: Deterministic side channels for untrusted operating systems. In Security and Privacy (SP), 2015 IEEE Symposium on (2015).

Yosinski, J., Clune, J., Nguyen, A. M., Fuchs, T. J., and Lipson, H. Understanding neural networks through deep visualization. CoRR abs/1506.06579 (2015).

Zeiler, M. D., and Fergus, R. Visualizing and understanding convolutional networks. In Computer Vision—ECCV 2014—13th European Conference (2014).

Zheng, W., Dave, A., Beekman, J. G., Popa, R. A., Gonzalez, J. E., and Stoica, I. Opaque: An oblivious and encrypted distributed analytics platform. In 14th USENIX Symposium on Networked Systems Design and Implementation (2017).

McKeen, F., Alexandrovich, I., Anati, I., Caspi, D., Johnson, S., Leslie-Hurd, R., and Rozas, C. Intel software guard extensions (intel sgx) support for dynamic memory management inside an enclave. In Proceedings of the Hardware and Architectural Support for Security and Privacy 2016 (New York, NY, USA, 2016), HASP 2016, ACM, pp. 10:1-10:9.

Nguyen, H., Acharya, B., Ivanov, R., Haeberlen, A., Phan, L.T., Sokolsky, O., Walker, J., Weimer, J., Hanson, W., Lee, I. Cloud-Based secure logger for medical devices. In Connected Health: Applications, Systems and Engineering Technologies (CHASE), 2016 IEEE First International Conference on (2016).

Shinde, S., Le Tien, D., Tople, S., and Saxena, P. Panoply: Low-tcb linux applications with sgx enclaves. In Proceedings of the Annual Network and Distributed System Security Symposium (2017).

Tsai, C., Porter, D.E., and Vij, M. Graphene-sgx: A practical library OS for unmodified applications on SGX. In 2017 USENIX Annual Technical Conference (2017).

IBM U.S. Appl. No. 16/016,752, filed Jun. 25, 2018 "Privacy Enhancing Deep Learning Cloud Service Using a Trusted Execution Environment".

IBM Appendix P.

* cited by examiner

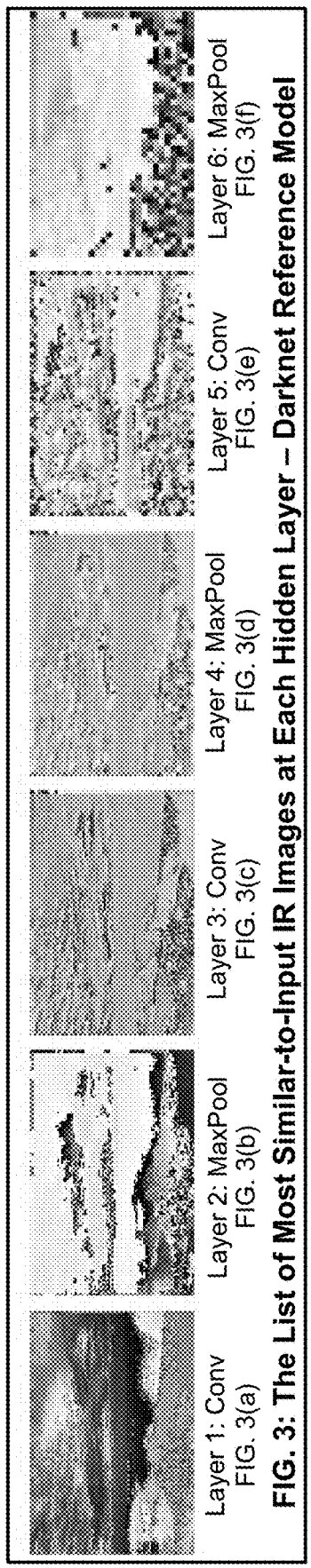
FIG. 3: The List of Most Similar-to-Input IR Images at Each Hidden Layer – Darknet Reference Model
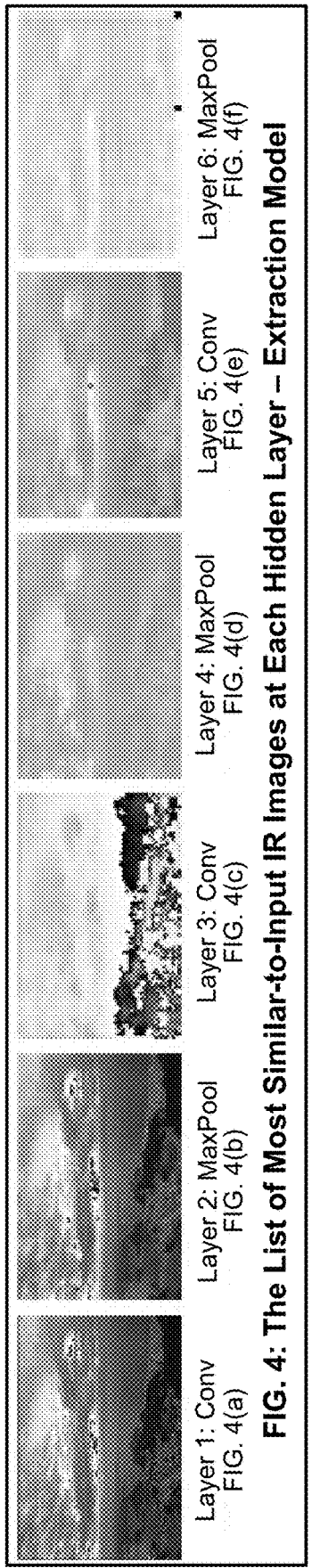
FIG. 4: The List of Most Similar-to-Input IR Images at Each Hidden Layer – Extraction Model
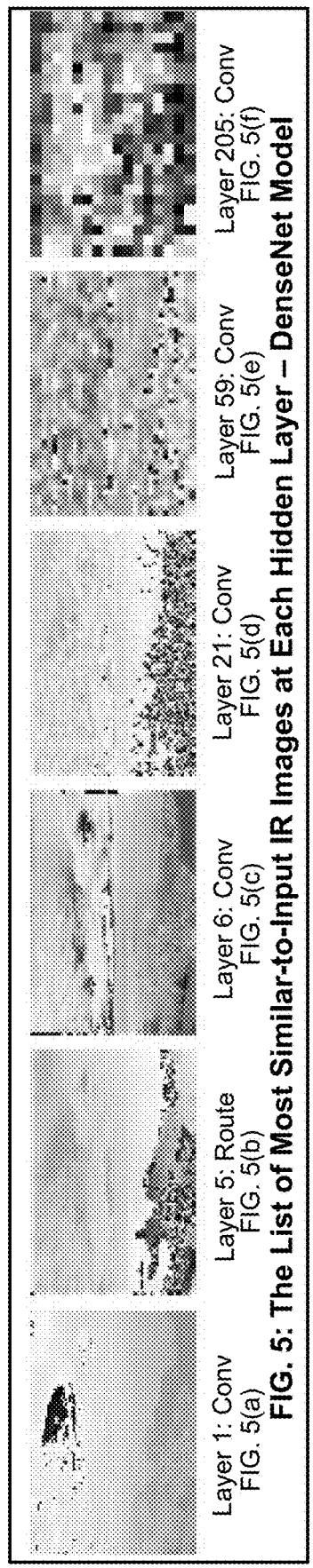
FIG. 5: The List of Most Similar-to-Input IR Images at Each Hidden Layer – DenseNet Model

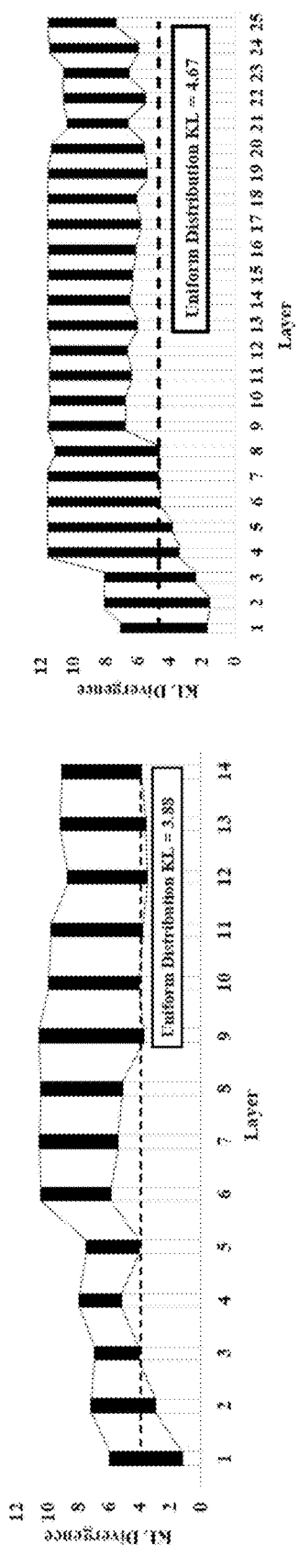
FIG. 6
FIG. 7
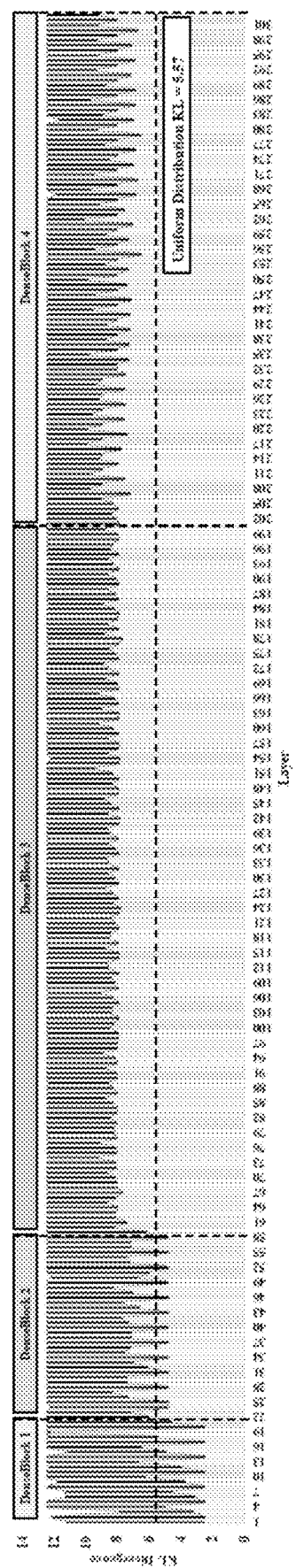
FIG. 8

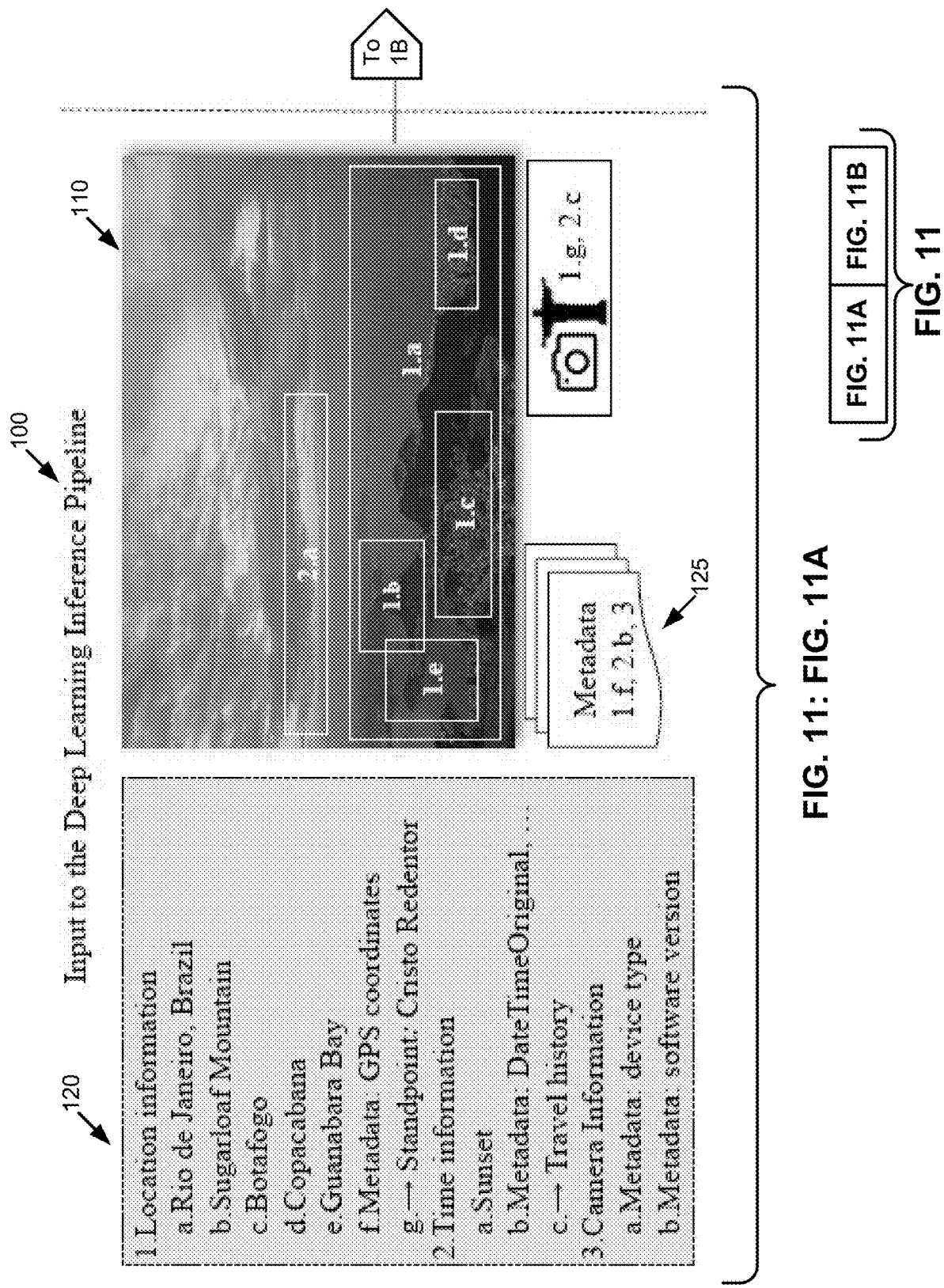
FIG. 11: FIG. 11A

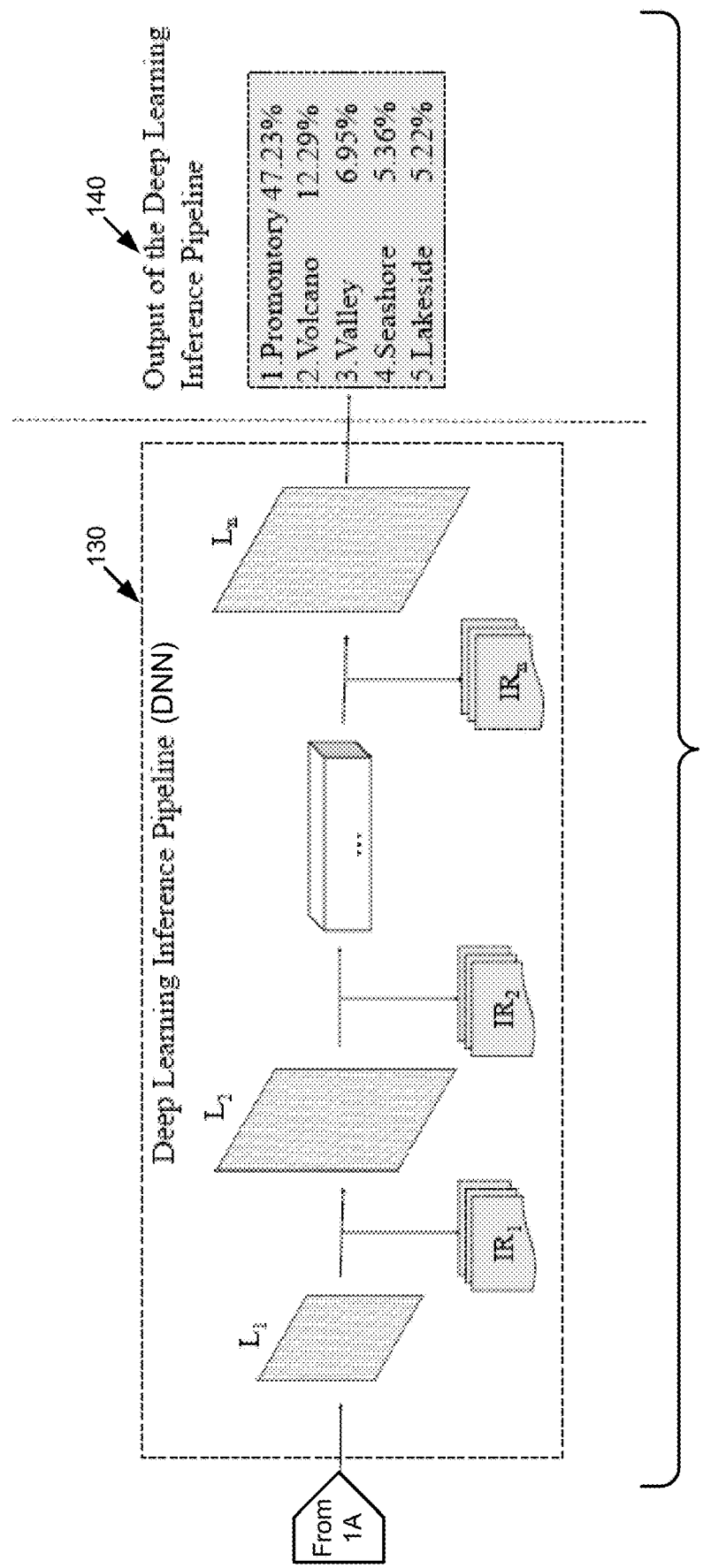
FIG. 11: FIG. 11B

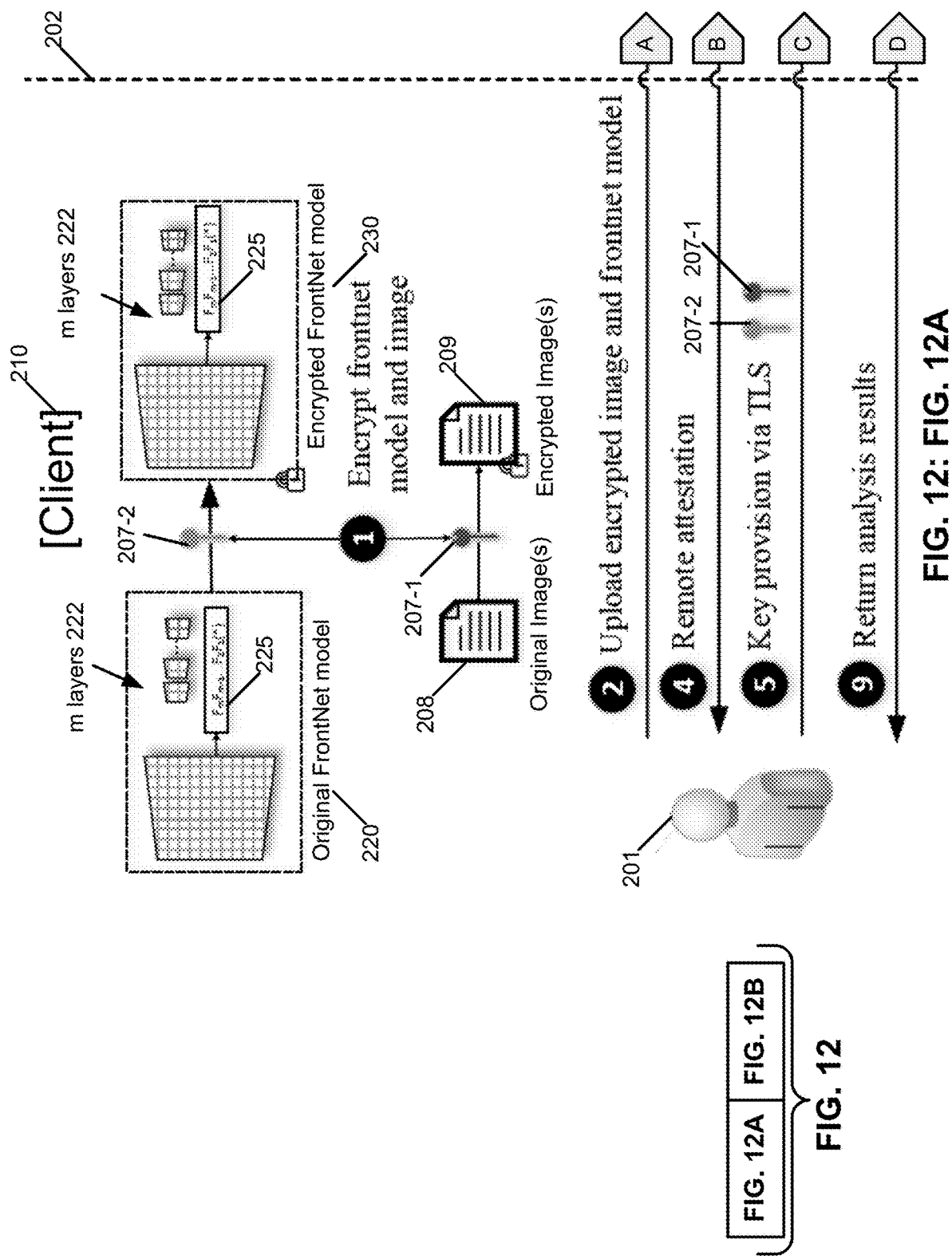
FIG. 12: FIG. 12A

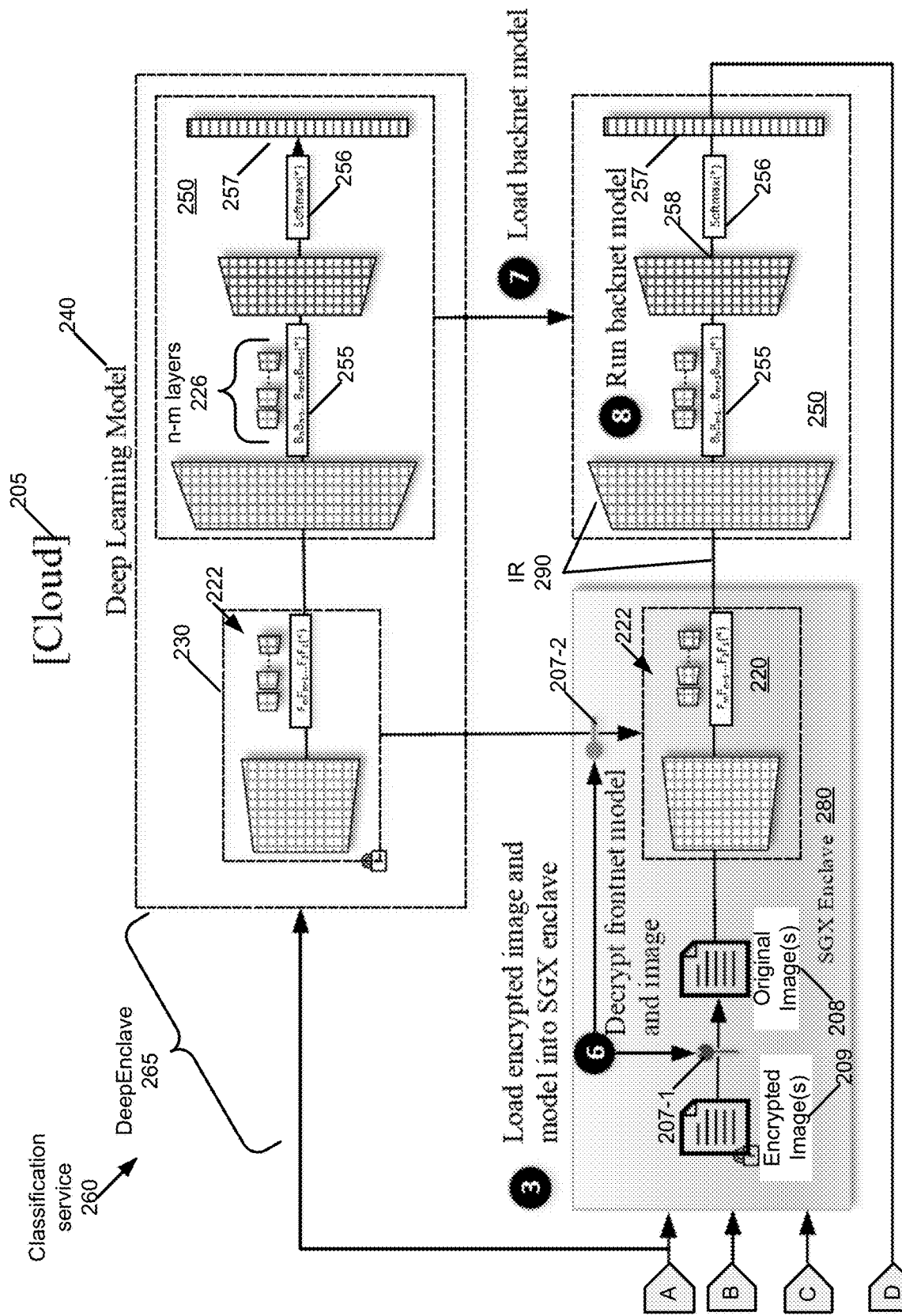
FIG. 12: FIG. 12B

Algorithm 1 Privacy-Enhancing DNN Classification

Input:
- img_enc      ▷ Encrypted image input
- fn_cfg      ▷ *FrontNet* neural network configuration
- fnw_enc      ▷ Encrypted *FrontNet* neural network weights
- bn_cfg      ▷ *BackNet* neural network configuration
- bnw      ▷ *BackNet* neural network weights
- ct      ▷ Client key provisioning ip 1: ################ Within SGX Enclave ################
2: ▷ Encrypted Input/Encrypted FRONTNET
3: function ENCLAVE_LOAD_ENC_MODEL(fn_cfg, fnw_enc, ct)
4:    tls ← ENCLAVE_ATTESTATION(ct)
5:    fnw_key, img_key ← ENCLAVE_GET_KEYS(ct, tls, fnw_t, img_t)
6:    fnw ← ENCLAVE_DECRYPT(fnw_enc, fnw_key)
7:    fn ← ENCLAVE_LOAD_WEIGHTS(fn_cfg, fnw)
8:
9: function ENCLAVE_INFERENCE_ENC_IMG(img_enc)
10:    img ← ENCLAVE_DECRYPT(img_enc, img_key)
11:    ir ← ENCLAVE_NETWORK_INFERENCE(fn, img)
12:    return ir
13:
14: ################ Out of SGX Enclave ################
15: ▷ Encrypted Input/Encrypted FRONTNET
16: function INF_ENC_MODEL_IMG(fn_cfg, fnw_enc, bn_cfg, bnw, img_enc, ct)
17:    eid ← INIT_ENCLAVE()
18:    ENCLAVE_LOAD_ENC_MODEL(eid, fn_cfg, fnw_enc, client)
19:    ir ← ENCLAVE_INFERENCE_ENC_IMG(eid, img_enc)
20:    bn ← LOAD_WEIGHTS(bn_cfg, bnw)
21:    result ← NETWORK_INFERENCE(bn, ir)
22:    return result DeepEnclave 265

310: Input block
320: Within SGX Enclave block
330: Out of SGX Enclave block
340: Combined 320+330

FIG. 13

SYSTEM FOR MEASURING INFORMATION LEAKAGE OF DEEP LEARNING MODELS

BACKGROUND

This invention relates generally to artificial intelligence (AI) and, more specifically, relates to information leakage in deep-learning-powered AI services.

Abbreviations that may be found in the specification and/or the drawing figures are defined below, at the beginning of the detailed description section.

For a deep-learning-powered AI service, end users need to upload their raw inputs, such as images and voice, to initiate the deep neural network (DNN) computation. In particular, that computation involves a training process, using the raw inputs, for an AI model used by the AI service. The resultant trained AI model can then be used for inferencing of other raw inputs provided by the end users, and the AI service will send the results of the inferencing to the end users.

However, raw inputs may contain sensitive information that end users may not want to expose to the service providers. Thus, it is crucial to understand and quantitatively measure what kind of information will be exposed, to what degree such information will be exposed during the deep learning process, and how that information may be protected.

SUMMARY

This section is meant to be exemplary and not meant to be limiting.

In an exemplary embodiment, a method for addressing information leakage in a deep learning service is disclosed. The method includes measuring, using a deep learning inference system, respective similarities for each of a set of intermediate representations to input information used as an input to the deep learning inference system. The deep learning inference system comprises a plurality of layers, each layer producing one or more associated intermediate representations. The method also includes selecting a subset of the set of intermediate representations that are most similar to the input information. The method further includes determining, using the selected subset of intermediate representations, a partitioning point in the plurality of layers used to partition the plurality of layers into two partitions defined so that information leakage for the two partitions will meet a privacy parameter when a first of the two partitions is prevented from leaking information. The method includes outputting the partitioning point for use in partitioning the plurality of layers of the deep learning inference system into the two partitions.

Another exemplary embodiment is an apparatus for addressing information leakage in a deep learning service. The apparatus comprises memory having computer program code and one or more processors. The one or more processors, in response to retrieval and execution of the computer program code, cause the apparatus to perform operations comprising: measuring, using a deep learning inference system, respective similarities for each of a set of intermediate representations to input information used as an input to the deep learning inference system, wherein the deep learning inference system comprises a plurality of layers, each layer producing one or more associated intermediate representations; selecting a subset of the set of intermediate representations that are most similar to the input information; determining, using the selected subset of intermediate representations, a partitioning point in the plurality of layers used to partition the plurality of layers into two partitions defined so that information leakage for the two partitions will meet a privacy parameter when a first of the two partitions is prevented from leaking information; and outputting the partitioning point for use in partitioning the plurality of layers of the deep learning inference system into the two partitions.

An additional exemplary embodiment is a computer program product. The computer program product comprises a computer readable storage medium having program instructions embodied therewith. The program instructions are executable by an apparatus to cause the apparatus to perform operations comprising: measuring, using a deep learning inference system, respective similarities for each of a set of intermediate representations to input information used as an input to the deep learning inference system, wherein the deep learning inference system comprises a plurality of layers, each layer producing one or more associated intermediate representations; selecting a subset of the set of intermediate representations that are most similar to the input information; determining, using the selected subset of intermediate representations, a partitioning point in the plurality of layers used to partition the plurality of layers into two partitions defined so that information leakage for the two partitions will meet a privacy parameter when a first of the two partitions is prevented from leaking information; and outputting the partitioning point for use in partitioning the plurality of layers of the deep learning inference system into the two partitions.

BRIEF DESCRIPTION OF THE SEVERAL VIEWS OF THE DRAWINGS

FIG. 3 is a list of most similar-to-input IR images at each hidden layer—Darknet reference model, and includes FIGS. 3(a), 3(b), 3(c), 3(d), 3(e), and 3(f), corresponding respectively to the following layers: Layer 1: Conv, Layer 2: MaxPool, Layer 3: Conv, Layer 4: MaxPool, Layer 5: Conv, and Layer 6: Maxpool;

FIG. 4 is a list of most similar-to-input IR images at each hidden layer—Extraction model, and includes FIGS. 4(a), 4(b), 4(c), 4(d), 4(e), and 4(f), corresponding respectively to the following layers: Layer 1: Conv, Layer 2: MaxPool, Layer 3: Conv, Layer 4: MaxPool, Layer 5: Conv, and Layer 6: Maxpool;

FIG. 5 is a list of most similar-to-input IR images at each hidden layer—DenseNet model, and includes FIGS. 5(a), 5(b), 5(c), 5(d), 5(e), and 5(f), corresponding respectively to the following layers: Layer 1: Conv, Layer 5: Route, Layer 6 Conv, Layer 21: Conv, Layer 59: Conv, and Layer 205: Conv;

FIG. 6 illustrates KL Divergence for Intermediate Representations (IRs) of Hidden Layers—Darknet Reference Model;

FIG. 7 illustrates KL Divergence for Intermediate Representations (IRs) of hidden layers—Extraction model;

FIG. 8 illustrates KL Divergence for Intermediate Representations (IRs) of hidden layers—DenseNet model;

FIG. 11, which is split over FIGS. 11A and 11B, is an illustration of information exposure in a deep learning inference pipeline;

FIG. 12, which is split over FIGS. 12A and 12B, illustrates an exemplary workflow of an image classification service in accordance with an exemplary embodiment;

FIG. 13 illustrates pseudo-code corresponding to FIG. 12 and is referred to as Algorithm 1, Privacy-Enhancing DNN Classification;

DETAILED DESCRIPTION

Figure 1:
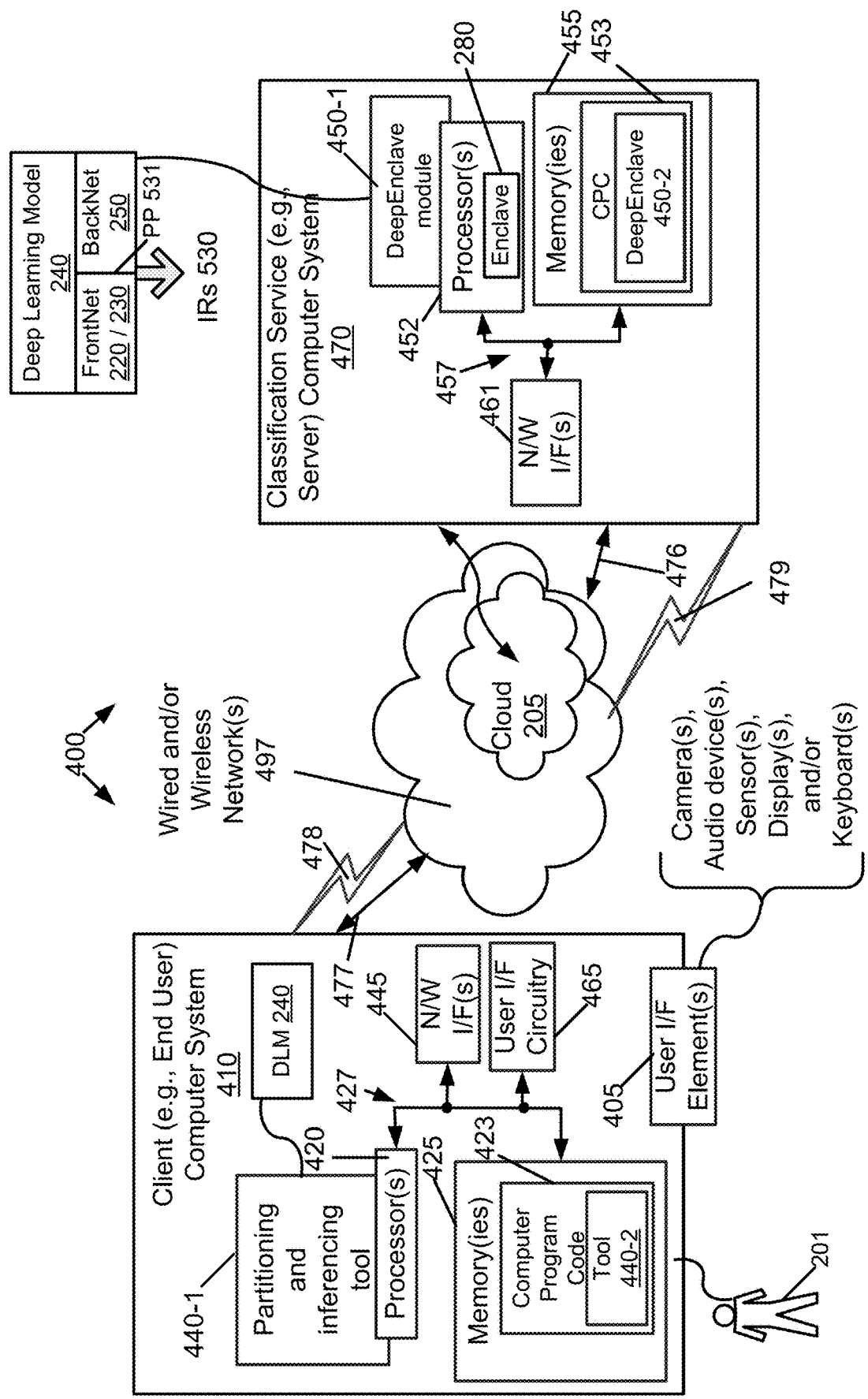
FIG. 1 is a block diagram of an exemplary and non-limiting system in which the exemplary embodiments may be implemented, in accordance with an exemplary embodiment.

The following abbreviations that may be found in the specification and/or the drawing figures are defined as follows:
  AI artificial intelligence
  API application programming interface
  ConvNet convolutional neural network
  CPU central processing unit
  DL deep learning
  DLM deep learning model
  DNN deep neural network, e.g., a neural network with two or more hidden layers
  GCM Galois counter mode
  ID identification
  IR intermediate representation
  KL Kullback-Leibler
  MEE memory encryption engine
  PP partitioning point
  SDK software development kit
  SGX software guard extensions
  SLOC source lines of code
  SMC secure multi-party computation
  TEE trusted execution environment
  TLS transport layer security The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As described above, raw inputs may contain sensitive information that end users may not want to expose to the service providers. Thus it is crucial to understand and quantitatively measure what kind of information will be exposed, and to what degree such information will be exposed during the deep learning process.

More generally, in the process of deep learning computation, the inputs are transformed into different intermediate results (IRs) layer by layer. We intend to quantitatively measure whether the IRs are semantically similar to the original inputs. If the IRs are similar to the original inputs, we consider that they might leak sensitive information of the inputs. The challenge of this task is how to quantitatively measure the similarity between the IRs and the original inputs. For a specific IR, we can project this IR to the same format as its original input, e.g., for a visual recognition system, we can project an IR to the pixel space to compare the IR with the input image. Considering the large volume of IR data generated in the middle of deep learning computations, it is a tedious and error-prone task for human beings to discover the IRs that leak input sensitive information. Considering that deep learning has already outperformed human benchmarks in various cognitive tasks, such as visual recognition and speech recognition, we design a novel neural-network-based assessment framework to automatically and quantitatively pick these IRs that reveal more information of the original inputs.

Some representative works that tend to understand and visualize IRs in neural networks are as follows. Zeiler and Fergus (M. D. Zeiler and R. Fergus, "Visualizing and understanding convolutional networks", in Computer Vision-ECCV 2014-13th European Conference, 2014) used the max unpooling and transposed convolution to project the feature activations of a Convolutional Neural Network (ConvNet) back to the input pixel space. Yosinski et al. (Jason Yosinski, et al., "Understanding neural networks through deep visualization", Deep Learning Workshop, International Conference on Machine Learning (ICML), 2015) designed a deep learning visualization framework to visualize the activations and features produced on each hidden layer of a trained ConvNet as it processes an input. Mahendran and Vedaldi (A. Mahendran and A. Vedaldi, "Understanding deep image representations by inverting them", in IEEE Conference on Computer Vision and Pattern Recognition, 2015) proposed a gradient descent based approach to reconstructing original images by inverting the intermediate representations. They restrict the inversion by adding a regularizer to enforce natural image priors. Dosovitskiy and Brox (A. Dosovitskiy and T. Brox, "Inverting visual representations with convolutional networks", in IEEE Conference on Computer Vision and Pattern Recognition, 2016) had a similar goal of inverting the intermediate representations. However, they do not need to manually define the natural image priors, but learn the priors implicitly and generate reconstructed images with an up-convolutional neural network. Compared to exemplary approaches herein, all current research works do not quantitatively measure the information leakage in the process of deep learning computation.

In order to address this, as an example, we design a neural-network-based assessment framework to measure the privacy leakage of intermediate representations (IRs) generated in the deep learning process. With our exemplary system in an exemplary embodiment, end users can understand what representations are generated in each hidden layer of the deep neural network (DNN) and whether such representations may leak the privacy information of the original inputs. Furthermore, end users can leverage the guidance of our exemplary measurement framework to choose corresponding privacy-enhancing techniques to protect the confidentiality of their inputs.

One exemplary idea of one of our methods is to test all IRs derived from a specific input with another ConvNet starting from the first layer. Then we can cross-validate the output of all IR images with the original output (prediction results) and choose these IRs that are most semantically similar to the original inputs. Because the IRs were never used as training data in the original ConvNet model, we can simply reuse the original model for validation purposes.

Additional details are provided below. Because the neural-network-based assessment framework builds on and interacts with other elements for securing input data and intermediate results of deep learning inference systems via partitioned enclave execution, these elements are also described herein. For ease of reference, the rest of this disclosure is divided into sections.

1. Introduction

The recent breakthroughs of deep learning (DL) are catalyzed by unprecedented amounts of data, innovations in learning methodologies, and the emergence of learning-accelerated hardware. DL-based approaches can achieve or surpass human-level performance on computer vision [30, 36, 58], speech recognition [25, 28, 31], machine translation [59], game playing [56, 57], and the like. Today major cloud providers offer artificial intelligence (AI) services, e.g., Amazon AI [1], Google Cloud AI [4], IBM Watson [6], and Microsoft Azure [8], powered with DL backend engines to help end users augment their applications and edge devices with AI capabilities. End users of AI services can be individuals or collective entities that represent independent software vendors, enterprises, health facilities, educational institutions, governments, and the like.

AI cloud providers generally offer two independent DL services, i.e., training and inference. End users can build customized DL models from scratch by feeding training services with their own training data. In case end users do not possess enough training data, they can also leverage transfer learning techniques to repurpose and retrain existing models targeting similar tasks. After obtaining their trained models, end users can upload the models, which are in the form of hyperparameters and weights of deep neural networks (DNNs), to inference services—which might be hosted by different AI service providers as of training services—to bootstrap their AI cloud application programming interfaces (APIs). These APIs can be further integrated into mobile or desktop applications. At runtime, end users can invoke the remote APIs with their input data and receive prediction results from inference services.

Although end users always expect that service providers should be trustworthy and dependable, the end users may still have some concerns about the data privacy of their inputs. Accidental disclosures of confidential data might unexpectedly occur due to malicious attacks, misoperations by negligent system administrators, or data thefts conducted by insiders. Adversaries with escalated privileges may be able to extract sensitive data from disks (data-at-rest) or from main memory (runtime data) [50-52]. We have observed numerous data breach events [5, 9] in recent years. Similar incidents can also happen to user input data for AI cloud services. In addition, deep learning is often differentiated by processing raw input data, such as images, audio, and video, as opposed to hand-crafted features. This poses more privacy concerns if the input data are leaked or compromised.

To address the data privacy problem on AI clouds, researchers proposed cryptographic-primitives-based approaches [22, 41, 45] to enable privacy-preserving predictions. Although they have increasingly made significant performance improvement, it is still far from being practical to apply such approaches to meet end users' requirements. The other line of approaches to protecting data privacy are based on distributed machine learning [39, 47, 54] which intended to delegate part of the deep learning functionality to the client sides and transfer masked feature representations to the cloud. However, these approaches complicated program logic and consumed more network bandwidth for client devices, which are not supposed to handle computing-intensive workload. We also observed that Ohrimenko et al. proposed data-oblivious multi-party machine learning algorithms (including neural networks) and leverage Intel Software Guard Extensions (SGX) to make them privacy-preserving. However, the performance (inadequate acceleration for matrix computation and floating-point arithmetic) and memory capacity (the protected physical memory size for an Intel Skylake CPU is 128 MB) constraints of SGX restrict the adaptability of their approach to deeper neural networks trained on large-scale datasets, e.g., ImageNet [17]. Note that with memory paging support for Linux SGX kernel driver, the size of enclave memory can be expanded with memory swapping. However, swapping on the encrypted memory will significantly affect the performance.

In this disclosure, we present DeepEnclave, a privacy-enhancing deep learning inference system to mitigate information exposure of sensitive input data in the inference pipelines. One exemplary innovation of DeepEnclave is to partition each deep learning model into a FrontNet and a BackNet by exploiting the layered structure of neural networks. End users are allowed to submit encrypted inputs and encrypted FrontNet to the system. In an exemplary embodiment, we leverage the Intel SGX on cloud infrastructures to enforce enclaved execution of the FrontNet and cryptographically protect the confidentiality and integrity of user inputs. Meanwhile, the inference computation of the BackNet runs out of secure enclaves and can still benefit from a performance improvement if cloud machines are equipped with DL-accelerated chips.

One key challenge of this approach is to determine the optimal model-specific partitioning points that balance the privacy protection and performance requirements. We formulate the information exposure problem as a reconstruction privacy attack and quantify the adversary's capabilities with different attack strategies and prior knowledge. We develop a neural network assessment framework to quantify the information leakage for the outputs of FrontNets with different numbers of layers and automate the process of finding optimal partitioning points for different neural network architectures. We conduct our security measurement on three ImageNet-level deep neural networks, i.e., Darknet Reference Model (17 layers) [2], Extraction Model (28 layers) [3], and DenseNet Model (306 layers) [33], with different network depths and architectural complexity. In addition, by protecting the confidentiality of both user inputs and FrontNet models, we ensure that our system can effectively defend against state-of-the-art input reconstruction techniques adaptable to deep neural networks. Our comprehensive security and performance analysis can be used as a guideline for end users to determine their own principle for partitioning DNNs, thus to achieve maximized privacy guarantee with acceptable performance overhead.

The primary thrust herein relates to using and performing measurements of information leakage, e.g., in order to secure input data and intermediate results of deep learning inference systems via partitioned enclave execution. The use and performance of measurements of information leakage is described first. Since this builds on a system for securing input data and intermediate results of deep learning inference systems via partitioned enclave execution, additional details for this are provided in Sections 6-9.

1.1 Exemplary System

As additional introduction, this section concerns an exemplary system suitable for implementing the exemplary embodiments. Turning to FIG. 1, this figure shows a block diagram of one possible and non-limiting exemplary system 400 in which the exemplary embodiments may be practiced.

Both the client computer system 410 and the classification service computer system 470 have access to a deep learning model 240 (e.g., an AI model such as a DNN). In simplistic terms, a user 201 would like to limit information leakage, e.g., from the intermediate representations (IRs) 530 that are produced from layers (not shown in this figure) of the deep learning model 240. The DeepEnclave module 450 provides a service of measuring the information leakage from the IRs 550 and providing a partitioning point 531 that may be used to separate the deep learning model 240 into a FrontNet 220 (not encrypted) or 230 (encrypted) and the BackNet 250. As explained in more detail below, the partitioning point is 531 is defined so that information leakage for the two partitions (FrontNet 220/230 and the BackNet 250) will meet a privacy parameter when a first (FrontNet 220) of the two partitions is prevented from leaking information, e.g., by being encrypted and being run inside an enclave 280.

In FIG. 1, a client (e.g., end-user) computer system 410 is in wired and/or wireless communication with a classification service (e.g., server) computer system 470 via the wired or wireless networks 797 (e.g., such as the Internet, local or wide area networks, and the like). It is assumed the client computer system 410 is a client that accesses the classification service computer system 470, e.g., as a server, and therefore the client computer system 410 will also be referred to as a client and the classification service computer system 470 will also be referred to herein as a server. However, there does not need to be a client/server relationship between the client computer system 410 and the classification service computer system 470.

The client computer system 410 includes one or more processors 420, one or more memories 425, one or more network (N/W) interfaces (I/F(s)) 445, and user interface circuitry 465, interconnected through one or more buses 427. The one or more buses 427 may be address, data, and/or control buses, and may include any interconnection mechanism, such as a series of lines on a motherboard or integrated circuit, fiber optics or other optical communication equipment, and the like. The one or more memories 425 include computer program code 423.

The client computer system 410 includes a partitioning and inferencing tool 440, comprising one of or both parts 440-1 and/or 440-2, which may be implemented in a number of ways. The partitioning and inferencing tool 440 may be implemented in hardware as verification module 440-1, such as being implemented as part of the one or more processors 420. The partitioning and inferencing tool 440-1 may be implemented also as an integrated circuit or through other hardware such as a programmable gate array. In another example, the partitioning and inferencing tool 440 may be implemented as partitioning and inferencing tool 440-2, which is implemented as computer program code 423 and is executed by the one or more processors 420. For instance, the one or more memories 425 and the computer program code 423 may be configured to, with the one or more processors 420, cause the client computer system 410 to perform one or more of the operations as described herein. It should also be noted that the devices shown in the client computer system 410 are not limiting and other, different, or fewer devices may be used.

The user interface circuitry 465 may communicate with one or more user interface elements 405, which may be formed integral with the client computer system 410 or be outside the client computer system 410 but coupled to the client computer system 410. The user interface elements 405 may include one or more of the following: one or more camera(s); one or more audio device(s) (such as microphone(s), speaker(s), and the like); one or more sensor(s) (such as GPS sensor(s), fingerprint sensor(s), orientation sensor(s), and the like; one or more displays; and/or one or more keyboards. This list is not exhaustive or limiting, and other, different, or fewer elements may be used. A user 201 (a human being in this example) interacts with the client computer system 410, e.g., to cause the system 410 to take certain actions as previously described in herein. These operations may also be caused by the client computer system 410 itself, in combination with actions by the user 201 or without actions by the user 201. The client computer system 410 communicates with the classification service computer system 470 via one or more wired or wireless networks 497, via wired links 477 and 478 and wireless links 478 and 479. The network (N/W) interfaces (TIF) 445 are wired and/or wireless circuitry providing this communication.

The classification service computer system 470 includes one or more processors 452, one or more memories 455, and one or more network interfaces (NM I/F(s)) 461, interconnected through one or more buses 457. The one or more memories 455 include computer program code 453. The classification service computer system 470 includes a DeepEnclave module 450, which is assumed to perform the operations described with the DeepEnclave 265. The DeepEnclave module 450 comprises one of or both parts 450-1 and/or 450-2, which may be implemented in a number of ways. For instance, the DeepEnclave module 450 may be implemented in hardware as DeepEnclave module 450-1, such as being implemented as part of the one or more processors 452. The DeepEnclave module 450-1 may be implemented also as an integrated circuit or through other hardware such as a programmable gate array. In another example, the DeepEnclave module 450 may be implemented as DeepEnclave module 450-2, which is implemented as computer program code 453 and is executed by the one or more processors 452. For instance, the one or more memories 455 and the computer program code 453 are configured to, with the one or more processors 452, cause the classification service computer system 470 to perform one or more of the operations as described herein. It should also be noted that the devices shown in the classification service computer system 470 are not limiting and other, different, or fewer devices may be used.

The one or more buses 457 may be address, data, and/or control buses, and may include any interconnection mechanism, such as a series of lines on a motherboard or integrated circuit, fiber optics or other optical communication equipment, wireless channels, and the like. The classification service computer system 470 is assumed to be remotely operated and therefore no user interface elements are shown. The network (N/W) interfaces (IIF) 461 are wired and/or wireless circuitry providing this communication.

The classification service computer system 470 has is an enclave 280, which is a protected area of execution. This is illustrated in FIG. 1 as being internal to the one or more processors 452, as would be the case for instance for an Intel SGX case (described in more detail below). Other processor manufacturers could also implement similar hardware support for security. These may also be implemented as other circuitry, such as secure cryptoprocessors, e.g., as one of the processors 452.

Additionally, the classification service computer system 470 may be separate from the networks 497, or part of a cloud 205, which is itself part of the networks 497. As is known, cloud computing is the delivery of computing services—such as servers, storage, databases, networking, software, analytics, and more—over networks such as the Internet.

Now that one possible exemplary system has been described, additional details regarding the exemplary embodiments are further described.

2 Security Analysis

In this section, we address the problem of determining the optimal partitioning points for deep neural networks via a comprehensive security analysis. Note that a description of building a system for partitioned enclave execution is described below, and this description is useful for understanding the problem of determining the optimal partitioning points.

Here we simulate two hypothetical adversaries, $A_1$ and $A_2$, within the privacy reconstruction attack framework (defined in Section 7) and they tend to uncover the contents of original raw input x after obtaining IRs out of the enclave. The adversary $A_1$ is closely associated with the neural network assessment framework, while $A_2$ is not directly related to that framework, but will be considered herein. We consider both adversaries have no prior knowledge of input x, i.e., probability matrix P holds the uniform distribution and $$\forall\, i,\, p_{ij} = \frac{1}{|\Omega|},$$

but they have different (from weak to strong) attack strategies A:

$A_1$: This adversary is able to view IRs generated out of the FrontNet. The strategy A is to pick the IR that reveals the most information of the original input. We measure, using a neural network assessment framework, the information exposure by assessing IRs at different partitioning layers of a DNN.

$A_2$: In addition to viewing the IRs, this more advanced adversary can further master these input reconstruction techniques for deep neural networks. Thus the strategy A of the adversary is to derive an inverse function $\phi^{-1}$ from $\Phi$ and compute $\tilde{x} = \phi^{-1}$ (IR). The reconstructed $\tilde{x}$ may leak the information of the original input x. We demonstrate that by design we can render such attacks ineffective. More specifically, $A_2$ can be addressed with secure enclave technology as described herein, even though $A_2$ is not directly related to the neural network assessment framework.

2.1 Perception of IRs ($A_1$

Based on our threat model, we assume that the adversary $A_1$ is able to retrieve the IR data of the hidden layers located out of SGX enclaves, even though the IRs may only reside in the computer memory. Therefore, it is crucial to investigate whether this adversary can perceive and infer the contents of the original inputs by viewing the IRs. In ConvNet, IRs are organized in the forms of stacked feature maps. Thus we project all feature maps back to the pixel space and save them as IR images. For example, if a convolutional layer of a model has 64 filters and the output is a 112×112×64 tensor, we can generate 64 IR images (112 in width and 112 in height) from its output. We conduct experiments for three ImageNet-level deep neural networks, i.e., Darknet Reference Model (17 layers with 5,040 IR images) [2], Extraction Model (28 layers with 12,880 IR images) [3], and DenseNet Model (306 layers with 107,888 IR images) [33].

One method to simulate this adversary is to let human subjects view all IR images and pick the ones that reveal the original input x's information. However, this task is tedious and error-prone for human beings considering the quantity of IR images they need to inspect and is also difficult to quantify the distance between x and IRs. Instead, we replace human subjects with another ConvNet (by exploiting ConvNet's approaching-human visual recognition capability) to automatically assess all IR images and identify the ones revealing most input information at each layer. This approach is based on the insight that if an IR image retains similar content as the input image, it will be classified into similar categories with the same ConvNet. By measuring the similarity of classification results, we can deduce whether a specific IR image is visually similar to its original input. End users can further leverage the assessment results to determine the optimal partitioning points for different neural network architectures.

Neural Network Assessment Framework and Method

Figure 2A:
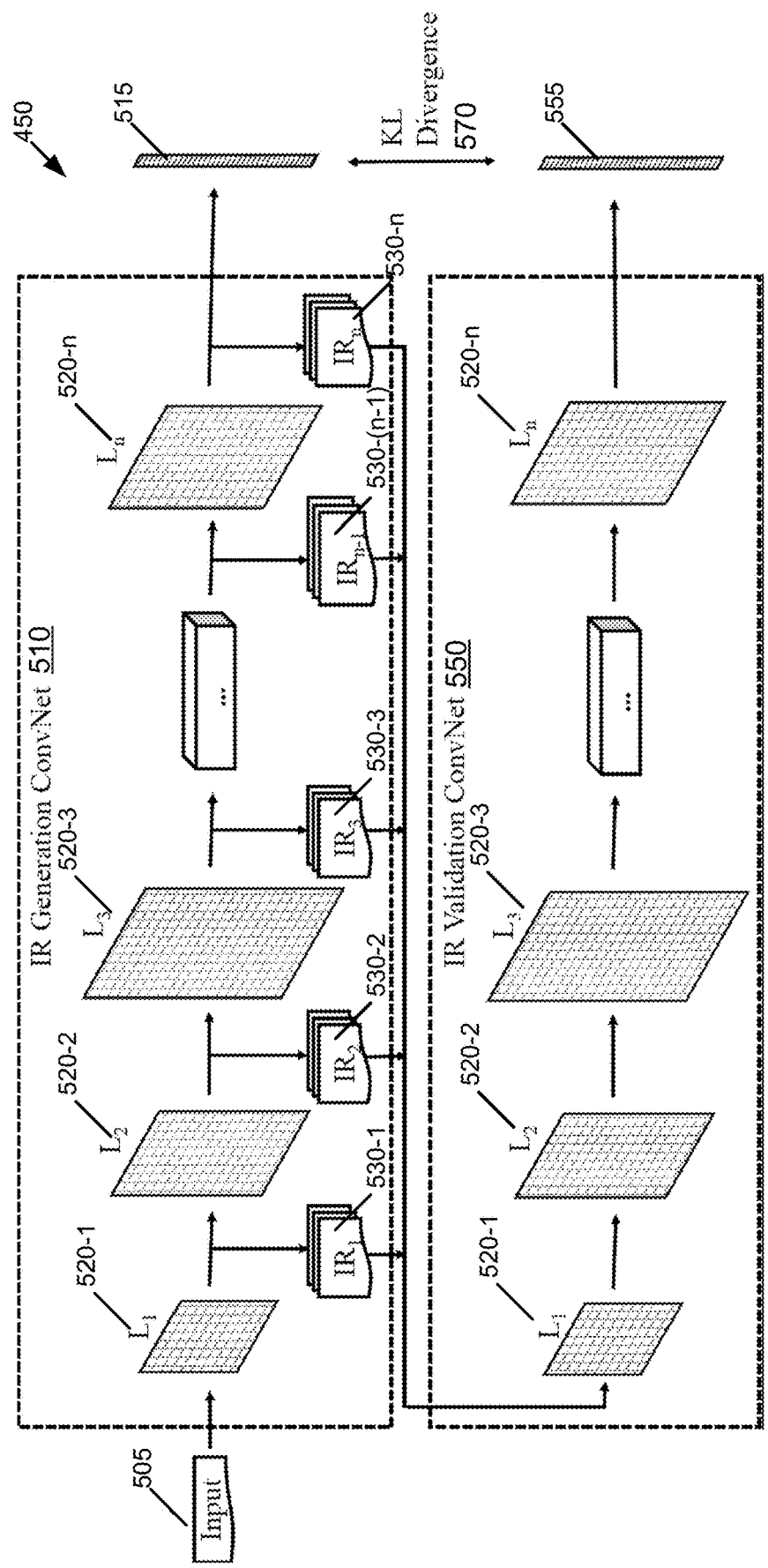
FIG. 2A is an illustration of an architecture of a neural network assessment framework used in a security analysis, in accordance with an exemplary embodiment.
Figure 2B:
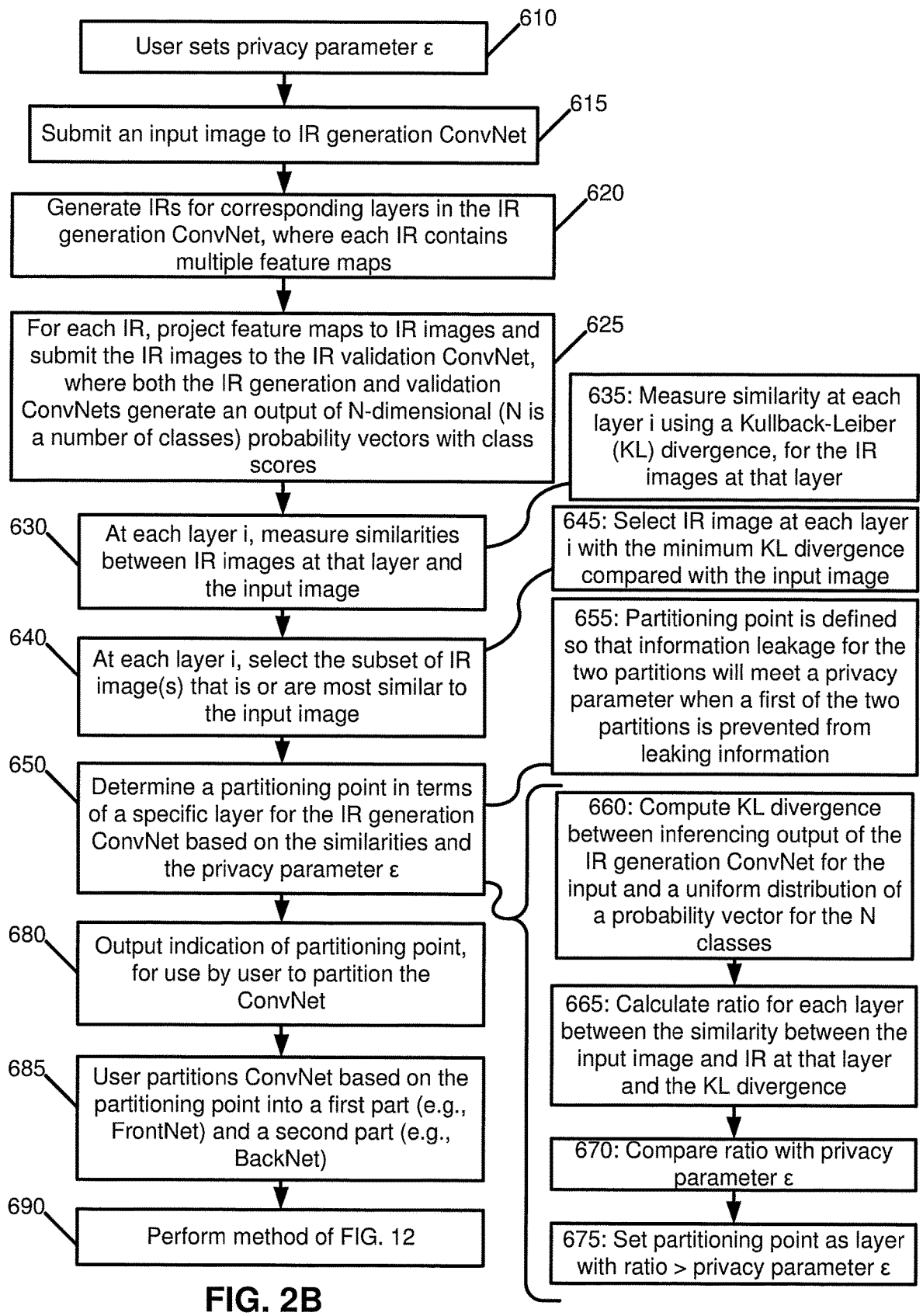
FIG. 2B is a flowchart for a method that uses, in part, the architecture in FIG. 2A, in accordance with an exemplary embodiment.

In FIG. 2A, we present an exemplary Dual-ConvNet architecture of one possible version of our neural network assessment framework. This architecture is assumed to be implemented as part of the DeepEnclave module 450 of the classification service computer system 470. FIG. 2B is a flowchart for a method that uses, in part, the architecture in FIG. 2A, in accordance with an exemplary embodiment. Most of the blocks in FIG. 2B are assumed to be performed by the classification service computer system 470, e.g., under control of the DeepEnclave module 450. Bath FIGS. 5A and 5B will be referred to in this section. It is noted that both FIGS. 5A and 5B concern use of images as input information 505 and for neural network techniques used therein. Other information, such as voice information, may be used instead of images.

At some point, a user 201 sets the privacy parameter ε. See block 610 of FIG. 2B.

In FIG. 2A, the IR generation ConvNet 510 (a first deep learning inference system, e.g., DNN) and the IR validation ConvNet 550 (a second deep learning inference system, e.g., DNN) comprise layers $L_1$ 520-1, $L_2$ 520-2, $L_3$ 520-3, . . . , 520-n. Intermediate representations (IRs) are also shown for the IR generation ConvNet 510, and there are n of these: $IR_1$ 530-1, $IR_2$ 530-2, $IR_3$ 530-3, . . . , 530-(n-1), and $IR_n$ 530-n.

We submit (block 615 of FIG. 2B) an input x 505 to the IR Generation ConvNet 510 (IRGenNet) and generate $IR_i$, i∈[1, n]. This submission may be caused by the user 201 and/or by the classification service computer system 470 (or a user of the classification service computer system 470). Each IR 530 contains multiple feature maps after passing layer i ($L_i$). This is illustrated by block 620 of FIG. 2B, where the classification service computer system 470 generates IRs for corresponding layers in the IR generation ConvNet, where each IR contains multiple feature maps.

Then we project feature maps to IR images and submit them to the IR Validation ConvNet 550 (IRValNet), which shares the same network architecture/weights as the IRGenNet 510. That is, in block 625 of FIG. 2B the classification service computer system 470, for each IR, projects feature maps to IR images and submits the IR images to the IR validation ConvNet 550. If each of the n IRs 530 has h, feature maps that get projected to images, the IR validation ConvNet 550 runs $$\sum_{i=1}^{n} h_i$$

times, one for each feature map/image from each IR 530 and produces an output 550 for each of these.

Both the IR generation and validation ConvNets generate an output of N-dimensional (N is a number of classes) probability vectors with class scores. The outputs 515, 555 of both ConvNets 510, 550, respectively, are typically N-dimensional (N is the number of classes) probability vectors with class scores.

In block 630, the classification service computer system 470, at each layer i, measures similarities between IR images at that layer and the input image. In an exemplary embodiment, we use the Kullback-Leibler (KL) divergence 570 to measure the similarity of classification results, although other similarity metrics might be used. See block 635. At each layer i, the classification service computer system 470 in block 640 selects a subset (one or more) of the IR images 530 that is or are most similar to the input image. While multiple IR images 530 may be selected, in an exemplary embodiment, we select a single IR image with the minimum KL divergence $D_{KL}$ (see block 645) with the input x to quantitatively measure the dist[x, $IR_i$]: $\forall j \in [1, \text{filter\_num} (L_i)]$, $$dist[x, IR_i] = \min_j (D_{KL}(F^*(x, \theta)\|F^*(IR_{ij}, \theta))) \quad (2)$$

$$= \min_j \left( \sum_k F^*(x, \theta)_k \log \frac{F^*(x, \theta)_k}{F^*(IR_{ij}, \theta)_k} \right),$$

where dist[x, $IR_i$] is a (minimum) similarity measure between the input x and the $IR_i$ that creates that minimum, $F^*(., \theta)$ is the representation function shared by both IRGen-Net 510 and IRValNet 550, and k is the index for the N-dimensional probability vector. Thus k ranges from 1 to N, and the subscript k indicates that we retrieve the k-th entry of an N-dimensional probability vector computed via $F^*(., \theta)$.

In block 650, the classification service computer system 470 determines a partitioning point in terms of a specific layer for the IR generation ConvNet 510 based on the similarities (dist[x, $IR_i$]) and the privacy parameter ε. As described herein (and see block 655) the partitioning point 531 is defined so that information leakage for the two partitions will meet a privacy parameter when a first of the two partitions (e.g., FrontNet model 220) is prevented from leaking information. That is, before being loaded into an enclave, the FrontNet is encrypted. But within an enclave 280, the FrontNet will be decrypted to run. The enclave is a blackbox to the external world, but running plaintext code/data within. The measurement system tells us after how many layers the IR output does not contain sensitive input information any more. Then we can run the FrontNet model 220 within an enclave 280 to protect the input in confidence.

Blocks 660-675 are an example of how block 650 might be performed. To determine the optimal partitioning point 531 for each neural network, we compute (see block 660) KL divergence between inferencing output 515 of the IR generation ConvNet 510 for the input 505 and a uniform distribution of a probability vector for the N classes. In more detail, the classification service computer system 470 computes $D_{KL}(F^*(x, \theta)\|\mu)$, where $\mu \sim U(0, N)$ is the uniform distribution of the probability vector, and N is the number of classes. This represents that has no prior knowledge of x before obtaining IRs and considers that x will be classified to all classes with equal chance. Based on Eq. (1), we can calculate (see block 665), using the classification service computer system 470, the ratio for each layer between the similarity between the input image and IR at that layer and the KL divergence calculated in block 660. In equations, calculate the ratio $$\delta_i = \frac{dist[x, IR_i]}{D_{KL}(F^*(x, \theta)\|\mu)}.$$

This ratio $\delta_i$ may be described in words as a ratio of "the minimum KL divergence of model outputs between input x and all IR images at layer i" and "the KL divergence between model output of input x and the uniform distribution". In block 670, this ratio $\delta_i$ is compared by the classification service computer system 470 with the user-specified privacy parameter ε bound. For example, if the user chooses ε=1, to avoid violating ε-privacy, it is safe to partition at layer i only if $\delta_i > \varepsilon = 1$. Thus, in block 675, the classification service computer system 470 sets the partitioning point 531 as a layer with the ratio $\delta_i$ greater than privacy parameter ε. That is, a "first" layer from a beginning layer where the first layer has its ratio greater than the privacy parameter may be selected as the partitioning point 531. It is worth noting that comparison with the uniform distribution with ε=1 is a very tight privacy bound for the information exposure. In a real-world scenario, end users 201 can relax the constraint to specify their specific ε∈[0,1] bound to satisfy their privacy requirements.

The classification service computer system 470 in block 680 outputs indication of partitioning point 531, for use by user 201 (and/or the client computer system 410) to partition the ConvNet 510 into two partitions (220, 250) based on the partitioning point 531. For instance, the partitioning point 531 in FIG. 12 (described below) is the layer m, and the classification service computer system 470 could output indication that the layer to be used as the partitioning point 531 is layer m.

In block 685, the user 201 causes the client computer system 410 to partition the ConvNet 510 into a first part (e.g., FrontNet model 220) and into a second part (e.g., BackNet model 250) based on the partitioning point 531 (e.g., layer m in FIG. 12). The user 201, client computer system 410, and classification service computer system 470 may then perform the method of FIG. 12 (see below) in block 690.

It is noted that, for some special deep neural networks, e.g., autoencoders, the IRs in deeper layers may be more similar to the original input. In that case, the measurement framework (e.g., classification service computer system 470) can output that there is no good partitioning point (e.g., due to the KL divergence scores climbing for middle layers and drop for deeper layers) for this specific neural network.

2.1.1 Model Analysis

Darknet Reference Model

This is a relatively small neural network for ImageNet classification. Its parameter amount is only 1110th of AlexNet [36], but it still retains the same prediction performance (Top-1: 61.1% and Top-5: 83.0%). We display the result of our assessment for the first six layers in FIG. 3. FIG. 3 is a list of most similar-to-input IR images at each hidden layer—Darknet reference model, and includes FIGS. 3(a), 3(b), 3(c), 3(d), 3(e), and 3(f), corresponding respectively to the following layers: Layer 1: Conv, Layer 2: MaxPool, Layer 3: Conv, Layer 4: MaxPool, Layer 5: Conv, and Layer 6: Maxpool. For each hidden layer, we choose the IR image that has the minimum KL divergence. For example, Layer 1 is a convolutional layer and the most similar IR image to the original input is generated by the sixth filter of this layer. We can still visually infer that the original content in the first several layers, but getting more and more difficult for subsequent layers. In FIG. 6, we present the range of KL divergence scores (black columns) for the IR images of all layers except the last three layers, i.e., average pooling, softmax, and cost layers, which do not generate IR images. For example, at Layer 1 the minimum KL divergence is 1.2 and the maximum is 5.9. We also highlight the line for the KL divergence of the uniform distribution, which is 3.88, with regard to x. We can find that after Layer 3, the minimum KL divergence scores approach and surpass the line of uniform distribution's KL, which indicates that viewing IRs after Layer 3 cannot help $A_1$ reveal information from the original input anymore. Thus end users can choose to partition the network at Layer 3 and enclose them to run within the enclave.

Extraction Model

Compared to the Darknet Reference Model, the Extraction Model is deeper and can achieve higher prediction accuracy (Top-1: 72.5% and Top-5: 90.0%). We present the most similar-to-input IR images of its first six layers in FIG. 4 and the KL divergence scores in FIG. 7. FIG. 4 is a list of most similar-to-input IR images at each hidden layer—Extraction model, and includes FIGS. 4(a), 4(b), 4(c), 4(d), 4(e), and 4(f), corresponding respectively to the following layers: Layer 1: Conv, Layer 2: MaxPool, Layer 3: Conv, Layer 4: MaxPool, Layer 5: Conv, and Layer 6: Maxpool. We can observe a similar phenomenon that after Layer 6, the KL divergence score ranges exceed the KL divergence of uniform distribution. Thus the safe partitioning point 531 for this neural network is at Layer 6.

DenseNet Model

In classical ConvNet architectures, each layer only obtains the input from its precedent layer. However, with the increase of network depth, it may lead to the vanishing gradient problem [11, 23]. To address this issue, researchers introduced short paths cross layers to make it practical to train very deep neural networks. The authors of the DenseNet Model introduced the neural network topology with DenseBlocks. Within each DenseBlock, each layer obtains inputs from all preceding layers and also transfers its own IRs to all subsequent layers. Between two adjacent DenseBlocks, it contains transitional layers to adjust the IR's size. We find that such special network structures, i.e., DenseBlocks and densely connected layers, can be consistently quantified with KL divergence. We show the KL divergence scores in FIG. 8. The DenseNet Model has four DenseBlocks. In each DenseBlock, the minimum KL divergence scores plummet regularly every two layers. The reason is that there exist route layers (after every two convolutional layers) that receive inputs from all preceding layers in the same DenseBlock. For example, the minimum KL divergence of Layer 4 (convolutional layer) is 5.07, while Layer (route layer) drops to 2.49. If we partition in the middle of DenseBlock 1, the following IRs in DenseBlock 1 can still reveal the input's information. However, there is no densely connected path that crosses different Dense-Blocks. Although there still exist fluctuations of KL divergence scores in the DenseBlock 2, the scores are significantly larger than layers in DenseBlock 1. FIG. is a list of most similar-to-input IR images at each hidden layer—DenseNet model, and includes FIGS. 5(a), 5(b), 5(c), 5(d), 5(e), and 5(f), corresponding respectively to the following layers: Layer 1: Conv, Layer 5: Route, Layer 6 Conv, Layer 21: Conv, Layer 59: Conv, and Layer 205: Conv. In FIG. 5, in addition to the Layer 1 and 5, we also display the most similar-to-input IR images at all transitional layers (Layers 21, 59, and 205) between different DenseBlocks. Based on the uniform distribution KL divergence (5,57), the optimal partition point is at Layer 21 (the last layer of DenseBlock 1), or for mare cautious end users, they can choose to partition at Layer 59 (the last layer of the DenseBlock 2).

Remarks

End users can choose to include fewer layers inside an enclave, which may leak some degree of information, or mare layers for stronger privacy guarantee, but may face some performance and usability constraints. As we have shown in the experiments for the three representative deep learning models, different neural network architectures may have different optimal partitioning points 531. With our neural network assessment framework (e.g., the partitioning and inferencing tool 440), end users 201 can test and determine the optimal partitioning layer for their specific deep learning models on local machines before uploading the inputs and models to the deep learning inference services.

2.2 Input Reconstruction Techniques ($A_2$

With a stronger adversarial model, we expect that the adversary $A_2$ may master advanced input reconstruction techniques, hence $A_2$ aims to first reconstruct the inputs from the intermediate representations. Note that $A_2$ can be addressed with the secure enclave technology, although $A_2$ is not directly related to the neural network assessment framework. We describe the general input reconstruction problem in deep neural networks formally as follows: the representation function at Layer i of a given DNN is $\Phi_i$: $R^{w \times h \times c} \rightarrow R^d$, which transforms the input x to $\Phi_i(x)$. Given an intermediate representation IR=$\Phi_i(x)$, the adversary tends to compute an approximated inverse function $\phi^{-1}$ to generate an input $\tilde{x}=\phi^{-1}$ (IR) that minimizes the distance between x and $\tilde{x}$. Here we qualitatively review the state-of-the-art input reconstruction techniques for deep neural networks, analyze the requirements or preconditions for these research works, and demonstrate that can protect the data privacy of user inputs from powerful adversaries equipped with these techniques.

Mahendran and Vedaldi [42]

In this work, the authors proposed a gradient descent based approach to reconstructing original inputs by inverting the intermediate representations. Following the formal description of the input reconstruction problem above, the objective of their approach is to minimize the loss function, which is the Euclid distance between $\Phi_i(x)$ and TR. Considering that $\Phi_i$ should not be uniquely invertible, they restrict the inversion by adding a regularizer to enforce natural image priors. In our design, the user-provisioned deep learning models are partially encrypted. The FrontNet models are encrypted by end users and are only allowed to be decrypted inside SGX enclaves. Assume $A_2$ knows the input reconstruction technique from Mahendran and Vedaldi [42], the representation function $\Phi_i$, which is equivalent to the FrontNet in our case, is not available in a decrypted form out of the enclave. In addition, we can also prevent the adversaries from querying the online FrontNet as a black-box to conduct their optimization procedure. The reason is that we use GCM to enable authenticated encryption. The enclave code can deny illegitimate requests, whose authentication tags cannot be verified correctly with end users' symmetric keys. Thus $A_2$ is not able to conduct the optimization procedure to compute both $\phi^{-1}$ and $\tilde{x}$.

Dosovitskiy and Brox [18]

This research has a similar goal of inverting the intermediate representations to reconstruct the original inputs. Compared to Mahendran and Vedaldi [42], the major difference is that they do not need to manually define the natural image priors, but learn the priors implicitly and generate reconstructed images with an up-convolutional neural network. They involve supervised training to build the up-convolutional neural network, in which the input is the intermediate representation $\Phi_i(x)$ and the target is the input x. This reconstruction technique cannot work either in our security setting. A needs to collect the training pairs $\{\Phi_i(x), x\}$. Because the FrontNet is guaranteed to be confidential, i.e., the $\Phi_i$ is unknown, $A_2$ cannot retrieve the model parameters and generate the training data to train the up-convolutional neural networks. Similarly, we can also prevent $A_2$ from querying the online FrontNet as a black-box to generate training pairs, because $A_2$ does not possess the end users' keys to encrypt the inputs and generate correct authentication tags. Thus enclave code will not return IRs to $A_2$. Without the up-convolutional neural network, $A_2$ cannot reconstruct the original input either.

3. Implementation

We build our research prototype based on Darknet[49], which is an open source neural network implementation in C and CUDA. We support both user-provisioned encrypted inputs and encrypted FrontNet. End users can partition their DNNs at a specific layer first and encrypt both the FrontNet and inputs with tools provided by us on their local machines. We also implement a neural network assessment framework to measure the quality of IRs at different layers. It can guide end users to determine, for each specific deep learning model, the optimal number of layers to include in a FrontNet and run within an enclave. In total, we add and revise 23,154 SLOC in C and 474 SLOC in Python for the development of DeepEnclave.

4. Performance Evaluation

In the performance evaluation, we measure the performance overhead for different system settings and indicate the constraint factors in practice. By understanding the trade-off between security and performance, end users can determine the level of security protection they tend to achieve and the corresponding performance and usability cost they may have to pay. Our testbed is equipped with an Intel i7-6700 3.40 GHz CPU with 8 cores, 16 GB of RAM, and running Ubuntu Linux 16.04 with kernel version 4.4.0.

Figure 9:
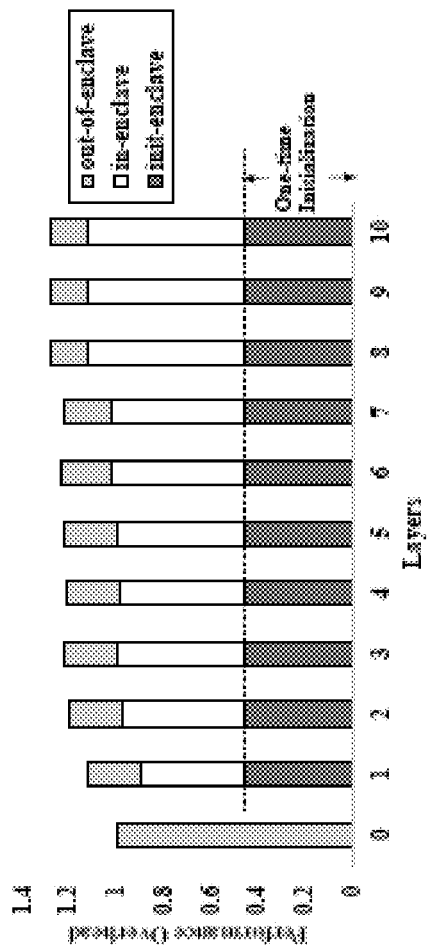
FIG. 9 illustrates performance overhead of running FrontNet in SGX enclaves (compiled with —O2)
Figure 10:
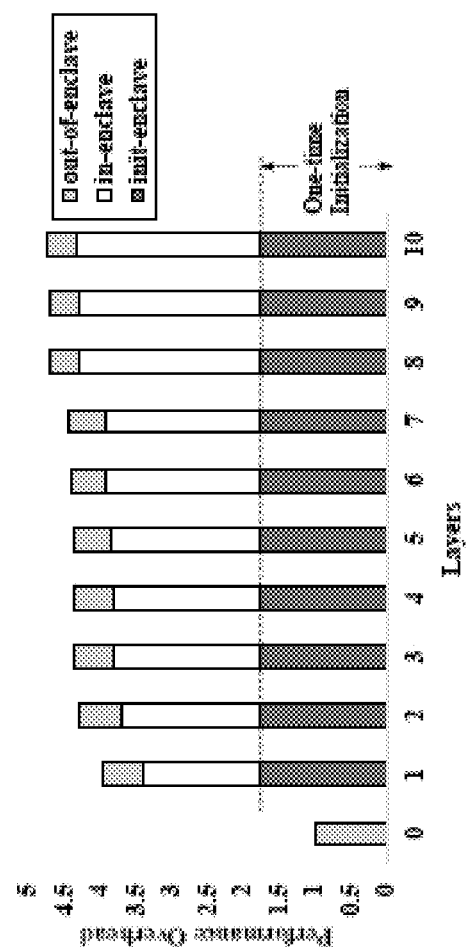
FIG. 10 illustrates performance overhead of running FrontNet in SGX enclaves (compiled with -Ofast)

We measure the inference performance of DeepEnclave by passing testing samples through the Extraction Model. In the base case, we load the whole neural network without using SGX and obtain the average time for predicting these unencrypted images. To compare with the base case, we partition the network, load multiple layers as the FrontNet inside an SGX enclave and the following layers out of the enclave, and obtain the same performance metrics. We need to emphasize that both images and the FrontNet models are encrypted in these cases and are decrypted at runtime inside SGX enclaves. Due to the SGX memory limitation, we can load up to 10 layers of the Extraction Model into the enclave. We compiled DeepEnclave with both gcc optimization level —O2 and -Ofast (with —O3 and -ffast-math enabled) and present the normalized performance results in FIGS. 9 and 10 respectively. For each individual input, we include the one-time overhead of enclave initialization in the performance measurement. We distinguish the performance overhead contributed by enclave initialization, in-enclave computation, and out-of-enclave computation with bars of different colors. Layer 0 is the base case with unencrypted inputs and all layers run out of the SGX enclave.

For optimization level at —O2, we observe the performance overhead increase from 12% for running one layer inside an enclave to 28% for ten layers. Initializations of enclaves contribute to the most significant portion of the additional performance overhead. However, once the enclave is initialized, we observe that an inference task within an SGX enclave has even lower performance overhead as running out of the enclave. This is mainly due to the characteristic of deep neural network computation, which is computing-intensive and can benefit a lot from using the CPU cache and decrease the rate to read and write the encrypted memory, which is considered to be expensive in SGX. In the cloud scenario, we do not need to initialize and tear down an enclave for each service request, but can run one enclave as a long-time service to serve all client requests. For optimization level at -Ofast, we observe that the absolute time for enclave initialization is at the same level as in FIG. 9. The in-enclave FrontNet computation causes 1.64×-2.54× overhead compared to the base case. The BackNet still conduct inference computation at the same speed as the base case. We speculate that the slow down inside the enclave is due to the ineffective -ffast-math flag for floating arithmetic acceleration. We expect that in the future Intel will release optimized math library within SGX enclave to further reduce the floating arithmetic overhead.

Compared to cryptographic primitives based approaches [22, 41, 45] and running whole neural network within a single enclave [46], the performance overhead of DeepEnclave makes online privacy-preserving deep learning inference feasible and adaptable for production-level large-scale deep neural networks. The out-of-enclave BackNet computation can still benefit from hardware acceleration and we grant the freedom to end users to adjust network partitioning strategy to satisfy their specific performance requirements.

5. Discussion

SGX Side-Channel Attacks

Since the inception of SOX as a TEE with a strong threat model, i.e., to guarantee confidentiality and integrity of computation upon untrusted or adversarial system software, we have observed research studies on a spectrum of side-channels to extract sensitive information from enclave execution. These side-channels include page faults [64], high-resolution timers [27], branch history [38], memory management [63], CPU cache [13, 15, 24, 27], and the like. In these case studies, side-channel attacks have been explored and applied to extract and further to infer sensitive information from various SGX-protected applications.

We have not observed any SGX side channel attacks to recover inputs of deep neural networks by now and we consider that such tasks are exceedingly difficult due to the special computation model of neural networks. For existing SGX side-channel attacks, the attackers need to eavesdrop the side-channel signals that leak the control transfer information. However, the memory access patterns of deep neural network computation do not depend on the input data. Thus it is impossible to recover input instance with the leaked side channel information. In addition, in our design for DeepEnclave, the FrontNet of the model is encrypted. This makes the prerequisites (availability of source code or binaries of target programs) for SGX side-channel attacks unsatisfied.

However, through side-channels, it is still possible to recover model hyperparameters, e.g., filter strides, activation function types, or the size of the inputs, which are pre-defined by deep learning model builders. Furthermore, if a deep learning image classification service needs to handle JPEG files as inputs, the file preprocessing procedure, i.e., the extraction of the pixel content of the images, may invoke some JPEG library functions, which have been demonstrated to be potentially vulnerable to side-channel attacks [27, 64].

Applicable Deep Learning Models

DeepEnclave is based on the feature distillation process in DNNs. However, our system does not apply to these information preserving neural networks designed for specific learning tasks. One representative case is the autoencoder [32], which is used for efficient encoding, dimension reduction, and learning generative models. No matter where we partition the autoencoder network, adversaries can always recover the (approximated) original inputs in any hidden layer. The reason is that autoencoder is trained to minimize the reconstruction errors between inputs and outputs. The original input information is always preserved (though could be compressed) in the autoencoder network. We leave the privacy protection for information-preserving neural networks for another time.

6. Motivation

Now that DeepEnclave's application to using and performing measurements of information leakage has been described, we provide additional detail about why measurements of information leakage are important and why a deep learning model 240 would be split into a FrontNet 220/230 and a BackNet 250 at a partitioning point 531.

By comparing the inputs and outputs of a deep learning based image classification system, we find that user input data might be unnecessarily exposed in deep learning inference pipelines. We give a motivating example in FIG. 11 (split over FIGS. 11A and 11B) to empirically demonstrate such information exposure. We input (reference 100) a picture 110 to a 1000-class image classification system with a Convolutional Neural Network (ConvNet) model (shown as deep learning inference pipeline (DNN) 130) trained on the ImageNet dataset. The output 140 of the system in one example is the Top-5 prediction class scores of the picture. Reference 120 indicates input information. This example has the deep learning inference pipeline 130 using n layers $L_1, L_2, \ldots, L_n$. Just like the idiom saying that "a picture is worth a thousand words", we can learn rich information from this input picture. It is obvious to tell that this picture was taken in Rio de Janeiro (1.a) by identifying the Sugarloaf Mountain (1.b). Anyone who is familiar with the geographical layout of Rio de Janeiro can also pinpoint Botafogo (1.c), Copacabana (1.d), and Guanabara Bay (1.e). In addition, we can further infer that the picture must be taken at the Cristo Redentor (1.g) because this is the only place you can have this specific view of the Sugarloaf Mountain. Based on the position (west side) of the sunlight, we can deduce that the time should be around sunset (2.a). Furthermore, if we check the EXIF metadata 125 of this picture, we can verify our previous hypotheses with the GPS coordinates (1.0 and the DayTimeOriginal (2.b). We can also obtain the device type (3.a) and its configuration (3.b, 3.c) by reading the metadata 125. If combined with other contextual information, it is possible to reveal the identity of the person who took this picture and recover his or her travel history (2.c).

On the contrary, the output 140 of the image classification system 130 only reveals limited information indicating that this picture can be classified as a promontory, volcano, valley, seashore, or lakeshore, with different confidence values. See the output 140. We consider that there is a privacy gap the represents the information discrepancy between the inputs and outputs at the two ends of the deep learning inference pipeline 130. The gap may disclose users' sensitive information to AI cloud providers, and further the information may possibly be leaked to malicious adversaries.

The computation of a deep neural network such as the pipeline 130 is to distill feature representations layer by layer. The process can be formulated as a composited transformation function that maps raw inputs to outputs with a specified target. Each layer performs its own transformation as a sub-function and generates an intermediate representation (IR) as an output, and there are, multiple intermediate representations (IRs), $IR_1$, $IR_2$, $IR_{n-1}$, for the hidden layers. Conceptually, transformation on each hidden layer contributes more or less to make the intermediate representations converge towards the final outputs. Our work is inspired by the research efforts for understanding the internals of deep neural networks [55, 65, 66]. As indicated by Zeiler and Fergus [66], for an image classification ConvNet, the shallow layers respond more to low-level photographic information, such as edges, corners, contours, of the original inputs, while deep layers can represent more abstract and class-specific information related to the final outputs. From the privacy perspective, low-level photographic information can reveal more precise and specific information of the original inputs. Whereas, high-level abstract representations generated in deep layers contain less private information. Therefore, to protect the sensitive information within inputs, we can choose to enclose a first several layers of a DNN into an isolated execution environment, which is kept confidential and tamper-resistant to external computing stacks.

7. Problem Definition

Based on the layered structure of deep neural networks, we partition each network in an exemplary embodiment into two independent subnet models, i.e., a FrontNet and a BackNet. Mathematically, a deep neural network can be defined as a function F* that maps the input x to the output y, i.e., y=F*(x; θ). θ stands for the parameters that are learned in the training phase. The function F* is composed of n (assuming the network has n layers) sub-functions $D_i$ where i∈[1, n]. $F_i$ maps the input $x_i$ to the output $y_i$ on Layer i. These sub-functions are connected in a chain. Thus y=F*(x; θ)=$F_n F_{n-1} \ldots F_1$(x). After partitioning the neural network at the m-th layer where m∈[1, n], the function for FrontNet can be represented as Φ:X→IR. X is the input space applicable for a specific deep neural network and IR is the output space for the intermediate representations. IR=Φ(x; $θ_Φ$)=$F_m F_{m-1} \ldots F_1$(x) and its output IR is the intermediate representation computed out of the FrontNet.

The function λ for BackNet is $\lambda(IR; \theta_\lambda) = F_n F_{n-1} \ldots F_{m+1}$(IR), in which IR is the input.

We assume that the adversaries might have some background knowledge B for reconstructing the sensitive original input x. The background knowledge includes: (1) the domain knowledge of user inputs, e.g. input file types, natural image priors[42]; (2) the knowledge on the distribution of all bits of x, which can be described by a probability matrix $P = \{\ldots, p_{ij}, \ldots\}$, where $p_{ij}$ is the probability that the i-th bit of x takes the value j, $1 \le i \le |x|$ and $j \in \Omega$, $\Omega$ is the encoding alphabet, and $\forall i, \Sigma_j p_{ij} = 1$.

Adversaries aim to reconstruct the inference input x: given an IR∈IR of x and the background knowledge B, the adversaries can devise an attack strategy A to return $\tilde{x}$, the reconstructed version of x. The attack strategy A can span from visually perceiving the intermediate representations to leveraging advanced input reconstruction techniques by approximating the inverse model. The FrontNet representation function Φ(.) is considered to violate the ε-privacy for x, if there exists an attack A, background knowledge B and intermediate representation IR, $$\frac{dist[x, \tilde{x} | \tilde{x} \leftarrow A(B, IR)]}{dist[x, \tilde{x} | \tilde{x} \leftarrow A(B)]} \le \varepsilon, \quad (1)$$

where ε is the privacy parameter to bound the distances between x and before and after observing IR and $\varepsilon \in [0,1]$. The dist measures the distance between an original input x and a reconstructed input $\tilde{x}$. Specifically, $dist[x, \tilde{x} | \tilde{x} \leftarrow A(B)]$ considers that $\tilde{x}$ is reconstructed only based on adversaries' background knowledge B. Whereas in $dist[x, \tilde{x} | \tilde{x} \leftarrow A(B, IR)]$, $\tilde{x}$ is reconstructed based on both the adversaries' background knowledge B and the observed IR. Equation (1) says that the privacy of the true inference input x is breached if adversaries can significantly reduce the distance between and x after obtaining the intermediate representation IR of x.

8. Threat Model

In our threat model, we assume that adversaries are able to obtain data from machines of deep learning cloud systems. There are multiple ways for them to achieve that. For example, attackers may exploit some zero-day vulnerabilities to penetrate and compromise the system software of the server. Insiders, such as cloud administrators, can also retrieve and leak data from the servers on purpose. The data can be files on disks or snapshots of physical memory. We assume that adversaries understand the format of the files stored on disks and they are able to locate and extract structured data (of their interest) from memory snapshots. We also expect that adversaries master the state-of-the-art techniques [18, 29, 42] for reconstructing inputs from IRs.

However, we assume that the adversaries cannot break into the perimeters of CPU packages to track the code execution and data flow at the processor level. We do not intend to address the side-channel attacks against Intel SGX in this document. It is noted that Intel Software Guard Extensions (Intel® SGX) is an Intel technology for application developers seeking to protect select code and data from disclosure or modification. Intel SGX makes such protections possible through the use of enclaves. Enclaves are protected areas of execution. Application code can be put into an enclave via special instructions and software made available to developers via the Intel SGX SDK. Although we do not intend to address extensively the side-channel attacks against Intel SGX, in Section 5, we introduce some recent representative SGX side-channel attacks, give an in-depth analysis why the core computation of deep neural networks is still resilient to side channel attacks, and the potential vulnerabilities.

We assume that adversaries do not have access to the training dataset, thus they cannot train a surrogate model. This is a reasonable assumption because end users only need to submit pre-trained models to AI cloud providers, rather than releasing their training dataset. Protecting training data privacy is out of the scope of this document. If end users depend on third-party training providers to train their models, they may consider privacy-preserving training mechanisms [44, 45, 46, 54] to protect training data from being leaked to training providers. Furthermore, we do not expect that adversaries have access to the whole (or the superset of) inference input datasets. Otherwise, we consider in this scenario the inference data have already been leaked and adversaries only need to determine which samples have been used as inputs, rather than reconstructing the contents of the inputs. Having the privilege to access inference input datasets is not realistic in the general settings of AI cloud services.

In addition, we intend to guarantee the data privacy of user input data, but protecting the confidentiality and integrity of final outputs of deep learning services is out of the scope of this document. Here we propose some preliminary solutions for the readers interested in this problem. To protect the prediction results, end users can upload models that only output class IDs, rather than meaningful class labels. Therefore, users can interpret the outputs on their local machines without leaking the classification results. In addition, end users can also deploy the DNN output layer, i.e., the last layer along with the softmax activation function, into a secure enclave and deliver the outputs directly to end users via a secure communication channel. To protect the integrity of outputs, end users may leverage statistical sampling methods to validate inference results via a local DNN that shares the same topology as its cloud counterpart.

9. System Design

In order to protect the confidentiality and integrity of user-provisioned inputs, we design DeepEnclave, a privacy-enhancing cloud-based deep learning inference system. Here we explain components of our system in detail.

9.1 Partitioning of DNNs

As defined in Section 7, the representation function for a FrontNet is $IR = \Phi(x; \theta_\Phi)$ and a BackNet is $y^* = \lambda(\Phi(x; \theta_\Phi); \theta_\lambda)$. The parameter θ of the original neural network is divided into $\theta_\Phi$ and $\theta_\lambda$ according to the network partition. The output shape of a FrontNet should be compatible with the input shape of its corresponding BackNet. We deliver IR as an input to a subsequent BackNet and continue the computation to get a result $y^*$. Given the same input x, we expect that $y^*$ should be equivalent to y, which is the output of the original neural network before the partition.

9.2 Secure Remote DNN Computation

On the cloud side, the FrontNet and inputs from end users should be loaded into a Trusted Execution Environment (TEE) that can guarantee the confidentiality, integrity, and freshness of the protected memory for secure remote computation. We choose to use the Intel SGX enclave as the TEE in our research prototype, but our approach in principle can also be generalized to other TEEs [12, 35]. With the protection of the memory access control mechanism and memory encryption engine (MEE) of the SGX, all non-enclave accesses from privileged system software or other untrusted components of systems will be denied. Thus the computational process of the user inputs with the FrontNet is kept within the perimeter of a specific CPU package and is invisible to the external world. The computation within an enclave is still naturally dedicated to distilling features for specific inference tasks, just exhibiting the same behaviors as its counterpart running out of the enclave. Furthermore, the enclave can attest to remote parties (i.e., the end users of AI cloud services) that the FrontNet is running in a secure environment hosted by a trusted hardware platform.

9.3 Confidentiality of Inference Inputs

In order to protect the contents of user inputs from being exposed on cloud servers, end users need to encrypt inputs with their symmetric keys and upload the encrypted files to cloud services. After finishing the remote attestation with the enclave, end users can provision the symmetric keys to the enclave via a secure communication channel. The code inside the enclave then decrypts the user inputs and passes the inputs to the FrontNet model, which should have been loaded in the same enclave. In addition, we leverage the Galois Counter Mode (GCM) to achieve authenticated encryption. Thus we can authenticate legitimate end users and render service abusing attacks ineffective. For the adversaries who tend to treat the in-enclave FrontNet as a black-box service and query to extract model information, they need to encrypt their inputs with the proper symmetric keys from the legitimate end users. Assuming that end users' keys are not leaked, we can deny serving these illegitimate requests that fail the integrity check and prevent the leakage of FrontNet model information, which is considered to be crucial for reconstructing user inputs.

In an initial design, we do not require end users to provide encrypted FrontNet models. This can protect the user data privacy if adversaries only intend to infer original inputs from FrontNet's IR outputs. We demonstrate in Section 2.1 that the quality of IR images (we map the IRs back to the pixel space) decay rapidly after passing first few layers. However, advanced adversaries may master the techniques to reconstruct inputs from IRs in neural networks. Although the convolution and pooling operations of ConvNet are not reversible, more powerful adversaries might have access to both the IRs and the model parameters. With some prior knowledge, adversaries can still approximately generate inputs that are similar to the original inputs [18, 29, 42]. In order to defend against such input reconstruction attacks, we enhance our design to support user-provisioned encrypted FrontNet. By protecting the confidentiality of both user inputs and the FrontNet model, all state-of-the-art (as far as we know) input reconstruction methods will no longer be effective. We provide a detailed analysis on why we can neutralize input reconstruction techniques in Section 2.2.

9.4 Exemplary Workflow

We summarize the workflow of DeepEnclave (using an image classification service as an example) by explaining the steps in FIG. 12 (split over FIGS. 12A and 12B) and corresponding pseudo-code in Algorithm 1 (see FIG. 13). In this case, an end user can provide both encrypted inputs and a pre-trained model (with an encrypted FrontNet). There are nine steps in FIG. 12, illustrated by numbers within circles. FIG. 12 is split into a client 210 section (FIG. 12A) and a cloud 205 section, separated by line 202. The following steps are from FIG. 12. For FIG. 13, there is an input section 310 which describes the inputs and a pseudo-code section 340 that outlines a possible implementation via software or hardware or both. The pseudo-code section 340 is further divided into a section 320 that uses a protected area of execution, in this example an Intel SGX enclave, and into a section 330 that is outside the protected area of execution. Both FIGS. 12 and 13 involve examples of DeepEnclave 265, an example of a privacy-enhancing deep learning inference system to mitigate information exposure of sensitive input data in the inference pipelines.

Step 1. The end user 201 needs to partition a deep learning model 240 into a FrontNet 220 and a BackNet 250 (e.g., we implement a tool to automate offline model partitioning in an exemplary embodiment). The end user 201 takes an original image 208 and encrypts it (e.g., using key 207-1) to create encrypted image 209. Similarly, the end user 201 encrypts the original FrontNet model 220 to create an encrypted FrontNet model 230. Both models 220, 230 include m layers 222. The m layers 222 are illustrated mathematically in block 225 as the following: $IR = \Phi(x; \theta_\Phi) = F_m F_{m-1} \ldots F_1(x)$, where the input is x. The FrontNet should be kept in secret and encrypted with a symmetric key 207 (e.g., key 207-2) from the end user 201, and is illustrated as (encrypted) FrontNet model 230. We do not expect to protect the BackNet model 250 in our scenario and the configuration and weights of BackNet model 250 are shared to the classification service 260, illustrated in cloud 205. As the BackNet model 250 is not supposed to run inside an SGX enclave 280 for performance constraints, we omit the discussion of the protection of parametric data of the BackNet here. But it might be better to use standard encryption mechanisms and protocols to protect the BackNet 250 in communication and at rest. In addition to encrypting the FrontNet model 220, the end user 201 also needs to encrypt the inputs (e.g., original image(s) 208) with her symmetric key 207. This example uses a key 207-1 for encryption of the original image 208 and another key 207-2 for encryption of the original FrontNet model 220, but other schemes are possible. It is noted that the FrontNet model 220/230 or will also be referred to as FrontNet 220/230, while the BackNet model 250 will also be referred to as BackNet 250.

Step 2. The end user 201 uploads the encrypted model 230 to the classification service 260 on the cloud 205, and uploads a cleartext BackNet 250 to the classification service 260. In this case, the classification service 260 is an image classification service, but this is merely exemplary, and other classification such as voice may be performed. Because this example uses images, the end user 201 is also using images, and she uploads the encrypted image 209 to the classification service 260. She only needs to provide the model 230 once to initiate the service. After the service starts, the end user 201 can continuously upload encrypted images 209 as inputs for classification.

Step 3. On the cloud 205 side, after receiving the encrypted image 209 and the encrypted FrontNet model 230, DeepEnclave 265 instantiates an Intel SGX enclave (init_enclave at line 17, see FIG. 13) and loads the encrypted FrontNet model 230 (enclave_load_enc_model at line 18 of FIG. 13) for deep neural network computation into the enclave 280. Then the cloud classification service 260 invokes the image classification API function (enclave_inference_enc_img at line 19 of FIG. 13) and securely copies the encrypted image 209 into the enclave 280 as the function argument.

Step 4. The end user 201 and the SGX enclave 280 need to perform a remote attestation [10] procedure. The enclave 280 can prove to the end user 201 that it is running on top of a trusted hardware platform with legitimate code/data from a trusted cloud service provider. The detailed description of the standard attestation protocol can be found in an example [7] provided by Intel. Due to the unclear licensing procedure for registering SGX enclave code and the prerequisites for using the Intel Attestation Server (IAS), we currently skip this step and instantiate a transport layer security (TLS) session directly between the end user 201 and the enclave 280.

Step 5. After creating a secure TLS communication channel, the end user 301 can provision symmetric keys 207-1, 207-2 (enclave_get_keys at line 5 of FIG. 13) directly into the enclave 280 on the cloud 205. The variable ip is the IP address for the key provisioning server.

Step 6. Inside the enclave 280, we verify the integrity of both the model 230 and the input 209 by checking their GCM authentication tags, and decrypt the FrontNet model 230 (enclave_decrypt at line 6 of FIG. 13) and the input 209 (enclave_decrypt at line 10 of FIG. 13) with the provisioned symmetric keys 207-1, 207-2 from the end user 201. These are illustrated in FIG. 13 as fnw_key for the encrypted FrontNet model 230 and img_key for the encrypted image 209. The "t" in fnw_t and img_t means type. We use fnw_t and img_t to tell the remote key provisioning server to give the keys to decrypt FrontNet weights and the input image. Then we can build a deep neural network (DNN) based on the (decrypted/origin) FrontNet 220 (enclave_load_weights at line 7 of FIG. 13), pass the decrypted input into the model (enclave_network_inference at line 11 of FIG. 13), and generate the IR 290, where the IR 290 is generated as $(IR=\Phi(x; \theta_\Phi)=F_m F_{m-1} \ldots F_1(x))$, from the FrontNet 220.

Step 7. The generated IR 290 is securely copied out of the enclave 280 through a controlled channel of SGX. We build another deep neural network (DNN) based on the BackNet model 250 (load_weights at line 20). The BackNet model 250 has (n-m) layers 226, where the function 255 λ for BackNet is $\lambda(IR; \theta_\lambda)=F_n F_{n-1} \ldots F_{m+1}(IR)$, in which IR 290 is the input. Note that the BackNet may also be written as $\lambda(IR; \theta_\lambda)=B_n B_{n-1} \ldots B_{m+1}(IR)$, as illustrated in FIG. 12.

Step 8. We then pass the IR 290 into the BackNet 250 and get the final classification result (network_inference at line 21 of FIG. 13). The layers 255 produce an output 258, which is passed through a Softmax(*) layer 256 to produce a final result 257. The final result 257 is an N-dimensional real-value vector that represents a probability distribution over N different possible classes.

Step 9. Based on the specification, the deep learning cloud classification service 260 can choose, for instance, to return the Top-k classes with their corresponding probabilities back to the end user.

10. Related Work

In this section we list the research efforts that might be closely related to our work and highlight exemplary unique contributions compared to these works.

Cryptographic Schemes Based Machine Learning

Most of the existing privacy-preserving machine learning solutions are based on cryptographic schemes, such as secure multi-party computation (SMC), fully homomorphic encryptions (FHE) [21], and the like. Solutions based on SMC protect intermediate results of the computation when multiple parties perform collaborative machine learning on their private inputs. SMC has been used for several fundamental machine learning tasks [19, 34, 40, 45, 61, 62]. Besides these protocol-based solutions, recently researchers also propose to leverage cryptographic primitives to perform deep learning inference. Gilad-Bachrach et al. proposed CryptoNets, a neural network model that makes predictions on data encrypted by FEE schemes. This approach protects the privacy of each individual input in terms of confidentiality. MiniONN [41] is an approach that transforms existing neural networks to an oblivious neural network that supports privacy-preserving predictions. Considering the significant performance overhead of using cryptographic schemes, we propose to leverage Intel SGX technology to keep part of the deep neural network computation in confidential on the cloud side. Hence we can protect the privacy of user inputs at inference and can defend against state-of-the-art input reconstruction attacks.

Distributed Deep Learning

Shokri and Shmatikov designed a distributed privacy-preserving deep learning protocol by sharing selective parameters and gradients for training deep neural network in a differentially private way. Ossia et al. proposed a distributed machine learning architecture to protect the user's input privacy. Their framework consists of a feature extractor on the mobile client side and a classifier on the server side. The server side performs inference task on the dimension-reduced extracted features from the mobile client. PrivyNet [39] is a splitting model deep learning training approach. They reused layers of pre-trained models for feature extraction on local machines and train the cloud neural network for the learning tasks based on the feature representations generated by the local neural network. Different from their work, our approach leverages the TEE on the cloud directly to guarantee the confidentiality of user inputs and the user-provisioned model. Thus we significantly simplify the client's logic and relieve client devices, which are supposed to have limited computing capacity and power usage restriction, from heavyweight neural network computation. In addition, our approach does not involve transferring intermediate representations through the network, thus eliminating the additional performance overhead for dimension reduction or data compression.

SGX Applications

Researchers leverage SGX technology to replace expensive cryptographic schemes for secure multi-party computation. Ohrimenko et al. intended to leverage trusted SGX-enabled CPU for privacy-preserving multi-party machine learning. They also proposed to make machine learning algorithm data-oblivious, in order to prevent the SGX side-channel attacks. The SGX technique is also used for efficient two-party secure function evaluation [26], private membership test [60], trustworthy remote entity [37]. Different from the goals of these works that focus on the data sharing privacy in collaboration tasks, our work intends to protect the user input privacy from being exposed to cloud providers. SGX technology is also widely researched in cloud scenarios. VC3 [53] ran distributed MapReduce computation within SGX enclaves on the cloud to keep the confidentiality of user's code and data. Opaque [67] was a distributed data analytics platform introducing SGX-enabled oblivious relational operators to mask data access patterns. SecureKeeper provided an SGX-enhanced ZooKeeper to protect the sensitive application data. HardTDX leveraged SGX to help search over encrypted data. Different in application scenarios, we intend to leverage SGX to protect the user input privacy and propose the SGX-enhanced partitioned deep learning model for the cloud services.

10. Conclusion

We systematically study the information exposure in deep learning inference and propose DeepEnclave, a privacy-enhancing deep learning system to minimize the sensitive information disclosure of user inputs. The key innovation of our system is to partition each deep neural network into two subnet models by exploiting the layered compositional network structure. We further leverage Intel SGX to protect the confidentiality of both user inputs and user-specified deep neural network layers. In addition, we design a neural network assessment framework to quantify the privacy loss and can help end users determine the optimal partitioning layers for different neural network architectures. Our system by design can render existing state-of-the-art input reconstruction techniques ineffective, thus eliminating the channels for adversaries to invert the deep neural networks and reconstruct the user inputs.

11. References

[1] Amazon AI. See the internet address: //aws.amazon.com/amazon-ai/.
[2] Darknet Reference Model. See the internet address: //pjreddie.com/darknet/imagenet/#reference.
[3] Extraction. See the internet address: //pjreddie.com/darknet/imagenet/#extraction.
[4] Google Cloud AT. See the internet address: //cloud.google.com/products/machine-learning/.
[5] Have I been pwned? See the internet address: //haveibeenpwned.com/.
[6] IBM Watson. See the internet address: //www.ibm.coml-watson/.
[7] Intel Software Guard Extensions Remote Attestation End-to-End Example. See the internet address: llsoftware.intel.com/en-us/articles/intel-software-guard-extensions-remote-attestation-end-to-end-example.
[8] Microsoft Azure Machine Learning. See the internet address: //azure.microsoft.com/en-us/services/machine-learning/.
[9] Wikipedia: List of data breaches. See the internet address: //en.wikipedia.org/wiki/List_of_data_breaches.
[10] Anati, I., Gueron, S., Johnson, S., and Scarlata, V. Innovative technology for cpu based attestation and sealing. In *Proceedings of the 2nd international workshop on hardware and architectural support for security and privacy* (2013).
[11] Bengio, Y., Simard, P., and Frasconi, P. Learning long-term dependencied with gradient descent is difficult. IEEE transactions on neural networks 5, 2 (1994), 157-166.
[12] Boivie, R., and Williams, P. Secureblue++: Cpu support for secure executables. Tech. rep., Research report, IBM, 2013.
[13] Brasser, F., Müller, U., Dmitrienko, A., Kostiainen, K., Capkun, S., and Sadeghi, A. Software grand exposure: SGX cache attacks are practical. *CoRR abs/*1702.07521 (2017).
[14] Brenner, S., Wulf, C., Goltzsche, D., Weichbrodt, N., Lorenz, M., Fetzer, C., Pietzuch, P. R., and Kapitza, R. Securekeeper: Confidential zookeeper using intel SGX. In *Proceedings of the 17th International Middleware Conference* (2016).
[15] Chen, G., Chen, S., Xiao, Y., Zhang, Y., Lin, Z., and Lai, T. H. Sgxpectre attacks: Leaking enclave secrets via speculative execution. *arXiv preprint arXiv:* 1802.09085 (2018).
[16] Costan, V., and Devadas, S. Intel sgx explained. *IACR Cryptology ePrint Archive* (2016), 86.
[17] Deng, J., Doug, W., Socher, R., Li, L.-J., Li, K., and Fei-Fei, L. Imagenet: A large-scale hierarchical image database. In *Computer Vision and Pattern Recognition, 2009. CVPR 2009. IEEE Conference on* (2009), IEEE, pp. 248-255.
[18] Dosovitskiy, A., and Brox, T. Inverting visual representations with convolutional networks. In *IEEE Conference on Computer Vision and Pattern Recognition* (2016).
[19] Du, W., Han, Y. S., and Chen, S. Privacy-preserving multivariate statistical analysis: Linear regression and classification. In *Proceedings of the 2004 SIAM international conference on data mining* (2004).
[20] Fuhry, B., Bahmani, R., Brasser, F., Hahn, F., Kerschbaum, F., and Sadeghi, A. Hardidx: Practical and secure index with SGX. In *Data and Applications Security and Privacy XXXI: 31st Annual IFIP WG 11.3 Conference* (2017).
[21] Gentry, C. A fully homomorphic encryption scheme. Stanford University, 2009.
[22] Gilad-Bachrach, R., Dowlin, N., Laine, K., Lauter, K. E., Naehrig, M., and Wernsing, J. Cryptonets: Applying neural networks to encrypted data with high throughput and accuracy. In *Proceedings of the 33nd International Conference on Machine Learning*, (2016).
[23] Glorot, X., and Bengio, Y. Understanding the difficulty of training deep feedforward neural networks. In Proceedings of the thirteenth international conference on artificial intelligence and statistics (2010), pp. 249-256.
[24] Gotzfried, J., Eckert, M., Schinzel, S., and Milner, T. Cache attacks on intel SGX. In *Proceedings of the 10th European Workshop on Systems Security* (2017).
[25] Graves, A., Mohamed, A., and Hinton, G. E. Speech recognition with deep recurrent neural networks. In *IEEE International Conference on Acoustics, Speech and Signal Processing* (2013).
[26] Gupta, D., Mood, B., Feigenbaum, J., Butler, K., and Traynor, P. Using intel software guard extensions for efficient two-party secure function evaluation. In *International Conference on Financial Cryptography and Data Security* (2016).
[27] Hahnel, M., Cui, W., and Peinado, M. High-resolution side channels for untrusted operating systems. In 2017 *USENIX Annual Technical Conference* (2017).
[28] Hannun, A. Y., Case, C., Casper, J., Catanzaro, B., Diamos, G., Eisen, E., Prenger, R., Satheesh, S., Sengupta, S., Coates, A., and Ng, A. Y. Deep speech: Scaling up end-to-end speech recognition. *CoRR abs/*1412.5567 (2014).
[29] He, K., Wang, Y., and Hoperoft, J. A powerful generative model using random weights for the deep image representation. In *Advances in Neural Information Processing Systems* (2016).
[30] He, K., Zhang, X., Ren, S., and Sun, J. Deep residual learning for image recognition. In *IEEE Conference on Computer Vision and Pattern Recognition* (2016).
[31] Hinton, G., Deng, L., Yu, D., Dahl, G. E., r. Mohamed, A., Jaitly, N., Senior, A., Vanhoucke, V., Nguyen, P., Sainath, T. N., and Kingsbury, B. Deep neural networks for acoustic modeling in speech recognition: The shared views of four research groups. *IEEE Signal Processing Magazine* (2012).

[32] Hinton, G. E., and Salakhutdinov, R. R. Reducing the dimensionality of data with neural networks. *science* 313, 5786 (2006), 504-507.

[33] Huang, G., Liu, Z., van der Maaten, L., and Weinberger, K. Q. Densely connected convolutional networks. In *Proceedings of the IEEE Conference on Computer Vision and Pattern Recognition* (2017).

[34] Jagannathan, G., and Wright, R. N. Privacy-preserving distributed k-means clustering over arbitrarily partitioned data. In *Proceedings of the eleventh ACM SIGKDD international conference on Knowledge discovery in data mining* (2005).

[35] Kaplan, D., Powell, J., and Woller, T. Amd memory encryption. Tech. rep., 2016.

[36] Krizhevsky, A., Sutskever, I., and Hinton, G. E. Imagenet classification with deep convolutional neural networks. In *Advances in Neural Information Processing Systems* (2012).

[37] Küçük, K. A., Paverd, A., Martin, A., Asokan, N., Simpson, A., and Ankele, R. Exploring the use of intel sgx for secure many-party applications. In *Proceedings of the 1st Workshop on System Software for Trusted Execution* (2016).

[38] Lee, S., Shih, M.-W., Gera, P., Kim, T., Kim, H., and Peinado, M. Inferring fine-grained control flow inside sgx enclaves with branch shadowing. In *26th USENIX Security Symposium* (2017).

[39] Li, M., Lai, L., Suda, N., Chandra, V., and Pan, D. Z. Privynet: A flexible framework for privacy-preserving deep neural network training with a fine-grained privacy control. *arXiv preprint arXiv:* 1709.06161 (2017).

[40] Lindell, Y., and Pinkas, B. Privacy preserving data mining. In *Advances in Cryptology CRYPTO 2000* (2000).

[41] Liu, J., Juuti, M., Lu, Y., and Asokan, N. Oblivious neural network predictions via minion transformations. In *ACM Conference on Computer and Communications Security* (CCS) (2017).

[42] Mahendran, A., and Vedaldi, A. Understanding deep image representations by inverting them. In *IEEE Conference on Computer Vision and Pattern Recognition* (2015).

[43] McKeen, F., Alexandrovich, I., Berenzon, A., Rozas, C. V., Shafi, H., Shanbhogue, V., and Savagaonkar, U. R. Innovative instructions and software model for isolated execution. In *Proceedings of the 2nd International Workshop on Hardware and Architectural Support for Security and Privacy* (2013).

[44] McMahan, H. B., Moore, E., Ramage, D., Hampson, S., et al. Communication-efficient learning of deep networks from decentralized data. *arXiv preprint arXiv:* 1602.05629 (2016).

[45] Mohassel, P., and Zhang, Y. Secureml: A system for scalable privacy-preserving machine learning. In *38th IEEE Symposium on Security and Privacy* (2017).

[46] Ohrimenko, O., Schuster, F., Fournet, C., Mehta, A., Nowozin, S., Vaswani, K., and Costa, M. Oblivious multi-party machine learning on trusted processors. In *USENIX Security Symposium* (2016).

[47] Ossia, S. A., Shamsabadi, A. S., Taheri, A., Rabiee, H. R., Lane, N., and Haddadi, H. A hybrid deep learning architecture for privacy-preserving mobile analytics. *arXiv preprint arXiv:* 1703.02952 (2017).

[48] Pan, S. J., and Yang, Q. A survey on transfer learning. *IEEE Transactions on knowledge and data engineering* (2010).

[49] Redmon, J. Darknet: Open source neural networks in c. See the internet address //pjreddie.com/darknet/, 2013-2016.

[50] Saltaformaggio, B., Bhatia, R., Gu, Z., Zhang, X., and Xu, D. Guitar: Piecing together android app guis from memory images. In *Proceedings of the 22nd ACM SIGSAC Conference on Computer and Communications Security* (2015).

[51] Saltaformaggio, B., Bhatia, R., Gu, Z., Zhang, X., and Xu, D. Vcr: App-agnostic recovery of photographic evidence from android device memory images. In *Proceedings of the 22nd ACM SIGSAC Conference on Computer and Communications Security* (2015).

[52] Saltaformaggio, B., Gu, Z., Zhang, X., and Xu, D. Dscrete: Automatic rendering of forensic information from memory images via application logic reuse. In *USENIX Security Symposium* (2014).

[53] Schuster, F., Costa, M., Fournet, C., Gkantsidis, C., Peinado, M., Mainar-Ruiz, G., and Russinovich, M. Vc3: Trustworthy data analytics in the cloud using sgx. In *Security and Privacy (SP), 2015 IEEE Symposium on* (2015).

[54] Shokri, R., and Shmatikov, V. Privacy-preserving deep learning. In *Proceedings of the 22nd ACM SIGSAC conference on computer and communications security* (2015), ACM.

[55] Shwartz-Ziv, R., and Tishby, N. Opening the black box of deep neural networks via information. *arXiv preprint arXiv:* 1703.00810 (2017).

[56] Silver, D., Huang, A., Maddison, C. J., Guez, A., Sifre, L., van den Driessche, G., Schrittwieser, J., Antonoglou, I., Panneershelvam, V., Lanctot, M., Dieleman, S., Grewe, D., Nham, J., Kalchbrenner, N., Sutskever, I., Lillicrap, T. P., Leach, M., Kavukcuoglu, K., Graepel, T., and Hassabis, D. Mastering the game of go with deep neural networks and tree search. *Nature* (2016).

[57] Silver, D., Schrittwieser, J., Simonyan, K., Antonoglou, I., Huang, A., Guez, A., Hubert, T., Baker, L., Lai, M., Bolton, A., et al. Mastering the game of go without human knowledge. *Nature* 550, 7676 (2017), 354-359.

[58] Simonyan, K., and Zisserman, A. Very deep convolutional networks for large-scale image recognition. *CoRR* abs/1409.1556 (2014).

[59] Sutskever, I., Vinyals, O., and Le, Q. V. Sequence to sequence learning with neural networks. In *Advances in neural information processing systems* (2014), pp. 3104-3112.

[60] Tamrakar, S., Liu, J., Paverd, A., Ekberg, J.-E., Pinkas, B., and Asokan, N. The circle game: Scalable private membership test using trusted hardware. In *Proceedings of the 2017 ACM on Asia Conference on Computer and Communications Security* (2017).

[61] Vaidya, J., and Clifton, C. Privacy preserving association rule mining in vertically partitioned data. In *Proceedings of the eighth ACM SIGKDD international conference on Knowledge discovery and data mining* (2002).

[62] Vaidya, J., Kantarcioğlu, M., and Clifton, C. Privacy-preserving naive bayes classification. *The VLDB Journal The International Journal on Very Large Data Bases* (2008).

[63] Wang, W., Chen, G., Pan, X., Zhang, Y., Wang, X., Bindschaedler, V., Tang, H., and Gunter, C. A. Leaky cauldron on the dark land: Understanding memory side-channel hazards in sgx. In *Proceedings of the 24th ACM SIGSAC conference on computer and communications security* (2017).

[64] Xu, Y., Cui, W., and Peinado, M. Controlled-channel attacks: Deterministic side channels for untrusted operating systems. In *Security and Privacy (SP)*, 2015 *IEEE Symposium on* (2015).

[65] Yosinski, J., Clune, J., Nguyen, A. M., Fuchs, T. J., and Lipson, H. Understanding neural networks through deep visualization. *CoRR abs*/1506.06579 (2015).

[66] Zeiler, M. D., and Fergus, R. Visualizing and understanding convolutional networks. *In Computer Vision-ECCV* 2014-13*th European Conference* (2014).

[67] Zheng, W., Dave, A., Beekman, J. G., Popa, R. A., Gonzalez, J. E., and Stoica, I. Opaque: An oblivious and encrypted distributed analytics platform. In 14*th USENIX Symposium on Networked Systems Design and Implementation* (2017).

13. Additional Information and Examples

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for addressing information leakage, comprising:
   generating inferencing output of a first deep learning inference system based on input information, wherein individual layers of the first deep learning inference system produce one or more associated intermediate representations to form a set of intermediate representations;
   generating inferencing output of a second deep learning inference system and based on individual ones of the set of intermediate representations from the first deep learning inference system, wherein the first and second deep learning inference systems share a same network architecture, including a same plurality of layers and weights;
   determining one or more similarity metrics between the input and the intermediate representations by comparing the inferencing output of the second deep learning inference system for individual ones of the intermediate representations with the inferencing output from the first deep learning inference system, wherein the one or more similarity metrics are calculated based on a divergence between the inferencing output from the first deep learning inference system and the inferencing output from the second deep learning inference system for individual ones of the intermediate representations;
   determining a partitioning point in the plurality of layers of the first deep learning inference system by selecting a subset of the set of intermediate representations that are most similar to the input information based on the determined one or more similarity metrics for the individual ones of the intermediate representations, wherein the partitioning point is defined so that information leakage for the first deep learning inference system will meet a provided privacy parameter;
   based on the partitioning point, partitioning the plurality of layers of the first deep learning inference system into a first partition and a second partition;
   placing the first partition into an enclave to protect the input information of the first deep learning inference system in confidence and placing the second partition into a cleartext part; and
   performing inferencing using the first and second partitions.

2. The method of claim 1, wherein selecting a subset of the set of intermediate representations that are most similar to the input information comprises:
   creating, using the second deep learning inference system, the inferencing output for the individual ones of the set of intermediate representations.

3. The method of claim 2, wherein selecting a subset of the set of intermediate representations that are most similar to the input information comprises:
   projecting, prior to creating the inferencing output, feature maps for each of the set of intermediate representations into a same input format as used by the input information; and
   inputting the individual ones of the intermediate representations in the input format to the second deep learning inference system for the second deep learning inference system to use when creating corresponding inferencing outputs.

4. The method of claim 3, wherein the input format is an image format.

5. The method of claim 1, wherein the divergence is a first divergence, inferencing for the first and second deep learning inference systems is performed for N classes, and wherein determining a partitioning point in the plurality of layers further comprises:
   computing a second divergence between inferencing output of the first deep learning inference system for the input information and a uniform distribution of a probability vector for the N classes;
   calculating a ratio for each of the plurality of layers as the corresponding selected intermediate representation divided by the second divergence; and
   comparing the calculated ratios with a value of the provided privacy parameter.

6. The method of claim 5, wherein determining a partitioning point in the plurality of layers further comprises:
   determining the partitioning point as a selected layer in the plurality of layers where a corresponding calculated ratio is greater than the value of the provided privacy parameter.

7. An apparatus for addressing information leakage, comprising:
   memory having computer program code; and
   one or more processors, wherein the one or more processors, in response to retrieval and execution of the computer program code, cause the apparatus to perform operations comprising:
   generating inferencing output of a first deep learning inference system based on input information, wherein individual layers of the first deep learning inference system produce one or more associated intermediate representations to form a set of intermediate representations;
   generating inferencing output of a second deep learning inference system and based on individual ones of the set of intermediate representations from the first deep learning inference system, wherein the first and second deep learning inference systems share a same network architecture, including a same plurality of layers and weights;
   determining one or more similarity metrics between the input and the intermediate representations by comparing the inferencing output of the second deep learning inference system for individual ones of the intermediate representations with the inferencing output from the first deep learning inference system, wherein the one or more similarity metrics are calculated based on a divergence between the inferencing output from the first deep learning inference system and the inferencing output from the second deep learning inference system for individual ones of the intermediate representations;
   determining a partitioning point in the plurality of layers of the first deep learning inference system by selecting a subset of the set of intermediate representations that are most similar to the input information based on the determined one or more similarity metrics for the individual ones of the intermediate representations, where the partitioning point is defined so that information leakage for the first deep learning inference system will meet a provided privacy parameter based on the partitioning point, partitioning the plurality of layers of the first deep learning inference system into a first partition and a second partitions;

placing the first partition into an enclave to protect the input information of the first deep learning inference system in confidence and placing the second partition into a cleartext part; and performing inferencing using the first and second partitions.

8. The apparatus of claim 7, wherein selecting a subset of the set of intermediate representations that are most similar to the input information comprises:

creating, using the second deep learning inference system, the inferencing output for the individual ones of the set of intermediate representations.

9. The apparatus of claim 8, wherein selecting a subset of the set of intermediate representations that are most similar to the input information comprises:

projecting, prior to creating the inferencing output, feature maps for each of the set of intermediate representations into a same input format as used by the input information; and inputting the individual ones of the intermediate representations in the input format to the second deep learning inference system for the second deep learning inference system to use when creating corresponding inferencing outputs.

10. The apparatus of claim 9, wherein the input format is an image format.

11. The apparatus of claim 7, wherein the divergence is a first divergence, inferencing for the first and second deep learning inference systems is performed for N classes, and wherein determining a partitioning point in the plurality of layers further comprises:

computing a second divergence between inferencing output of the first deep learning inference system for the input information and a uniform distribution of a probability vector for the N classes;

calculating a ratio for each of the plurality of layers as the corresponding selected intermediate representation divided by the second divergence; and comparing the calculated ratios with a value of the provided privacy parameter.

12. The apparatus of claim 11, wherein determining a partitioning point in the plurality of layers further comprises:

determining the partitioning point as a selected layer in the plurality of layers where a corresponding calculated ratio is greater than the value of the provided privacy parameter.

13. A computer program product comprising a computer readable storage medium having program instructions embodied therewith, the program instructions executable by an apparatus to cause the apparatus to perform operations comprising:

generating inferencing output of a first deep learning inference system based on input information, wherein individual layers of the first deep learning inference system produce one or more associated intermediate representations to form a set of intermediate representations;

generating inferencing output of a second deep learning inference system and based on individual ones of the set of intermediate representations from the first deep learning inference system, wherein the first and second deep learning inference systems share a same network architecture, including a same plurality of layers and weights;

determining one or more similarity metrics between the input and the intermediate representations by comparing the inferencing output of the second deep learning inference system for individual ones of the intermediate representations with the inferencing output from the first deep learning inference system, wherein the one or more similarity metrics are calculated based on a divergence between the inferencing output from the first deep learning inference system and the inferencing output from the second deep learning inference system for individual ones of the intermediate representations;

determining a partitioning point in the plurality of layers of the first deep learning inference system by selecting a subset of the set of intermediate representations that are most similar to the input information based on the determined one or more similarity metrics for the individual ones of the intermediate representations, wherein the partitioning point is defined so that information leakage for the first deep learning inference system will meet a provided privacy parameter;

based on the partitioning point, partitioning the plurality of layers of the first deep learning inference system into a first partition and a second partition;

placing the first partition into an enclave to protect the input information of the first deep learning inference system in confidence, and placing the second partition into a cleartext part; and performing inferencing using the first and second partitions.

14. The computer program product of claim 13, wherein selecting a subset of the set of intermediate representations that are most similar to the input information comprises:

creating, using the second deep learning inference system, the inferencing output for the individual ones of the set of intermediate representations.

15. The computer program product of claim 14, wherein selecting a subset of the set of intermediate representations that are most similar to the input information comprises:

projecting, prior to creating the inferencing output, feature maps for each of the set of intermediate representations into a same input format as used by the input information; and inputting the individual ones of the intermediate representations in the input format to the second deep learning inference system for the second deep learning inference system to use when creating corresponding inferencing outputs.

* * * * *